(12) United States Patent
Deyaf et al.

(10) Patent No.: US 10,692,304 B1
(45) Date of Patent: Jun. 23, 2020

(54) AUTONOMOUS COMMUNICATION AND CONTROL SYSTEM FOR VEHICLES

(71) Applicant: Feniex Industries, Inc., Austin, TX (US)

(72) Inventors: Hamza Deyaf, Austin, TX (US); Bret Hubber, Austin, TX (US); Kyle Hale, Austin, TX (US); Nick Marth, Austin, TX (US); Avery Zamzow, Austin, TX (US); Garrett Mancillas, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 16/455,312

(22) Filed: Jun. 27, 2019

(51) Int. Cl.
*G07C 5/00* (2006.01)
*G08G 1/00* (2006.01)
*H04W 4/44* (2018.01)
*H04L 12/40* (2006.01)

(52) U.S. Cl.
CPC .............. *G07C 5/008* (2013.01); *G07C 5/006* (2013.01); *G08G 1/20* (2013.01); *H04L 12/40* (2013.01); *H04W 4/44* (2018.02); *H04L 2012/40215* (2013.01)

(58) Field of Classification Search
CPC .......... G07C 5/008; G07C 5/006; G08G 1/20; H04W 4/44; H04L 12/40; H04L 2012/40215

USPC ......................................................... 701/31
See application file for complete search history.

(56) References Cited

U.S. PATENT DOCUMENTS

| | | | |
|---|---|---|---|
| 8,604,920 B2 | 12/2013 | Armitage et al. | |
| 10,002,520 B2 | 6/2018 | Bohlander et al. | |
| 10,321,039 B2 | 6/2019 | Bohlander et al. | |
| 2018/0289999 A1* | 10/2018 | Kay | G07C 5/085 |
| 2019/0066407 A1* | 2/2019 | Kwak | G06Q 50/30 |

* cited by examiner

*Primary Examiner* — Marthe Y Marc-Coleman

(57) ABSTRACT

An autonomous communication and control system for controlling auxiliary equipment associated with a vehicle includes a vehicle mounted controller and output relay module. The controller includes an interface for receiving user input commands relating to control actions to be taken with respect to the auxiliary equipment. The controller is adapted to wirelessly communicate indications of the actions taken with respect to the auxiliary equipment (events) as well as other data relating to the status of the vehicle. The controller interface includes a display for displaying the messages for an occupant of the vehicle. The controller may be adapted to communicate information regarding the operating status of the vehicle for fleet management and maintenance purposes and may also be adapted for monitoring an inventory of removable assets to ensure the vehicle is stocked with necessary equipment for carrying its assigned duties.

30 Claims, 11 Drawing Sheets

AUTONOMOUS COMMUNICATION AND CONTROL SYSTEM FOR VEHICLES

FIELD OF THE DISCLOSURE

The present invention relates to an autonomous communication and control system (ACCS) for vehicles. The representative embodiments disclosed herein are adapted to control auxiliary equipment associated with vehicles and to communicate information about the status of the auxiliary equipment and other vehicle systems to one or more remote locations such as a dispatch control center, a fleet maintenance garage, or any other desired location. Decisions regarding the deployment and disposition of individual vehicles within a fleet of vehicles may be based on the information received at the remote location. Messages may be communicated from the remote location to individual vehicles, a group of vehicles, or an entire fleet of vehicles. Embodiments are further adapted to detect the presence of removable assets within the vehicles and to alert occupants when assets are missing from the vehicle.

BACKGROUND

Many vehicles, especially special purpose vehicles such as police cars, fire trucks, ambulances and the like, are outfitted with auxiliary equipment that allows the vehicles to better perform their specialized tasks. Police, fire, and emergency medical services (EMS) vehicles all typically include a variety of lights and audio equipment, including but not limited to, light bars, deck and dash lights, perimeter lights, light sticks, speakers, sirens, and the like. Flashing lights and sirens may be used to warn the public that some sort of emergency is occurring and that other vehicles should make way to allow the emergency vehicle to pass or move over to avoid the scene of an accident. Emergency vehicles may also have public address systems for communicating with the public, radios, data terminals, laptops, and/or tablets (or other similar devices) used to connect to a network in order to communicate with other vehicles, a dispatch control center, a fleet management center, or some other location.

In addition to the auxiliary equipment mounted on the vehicle, emergency vehicles are generally stocked with a large amount of removable equipment. Police cruisers may carry traffic cones, flairs, reflective warning signs, first aid kits, flashlights, blankets, rifles, shot guns and more. Fire trucks and ambulances can be loaded with even more removable equipment. As these items are removable, it often occurs that these useful items are removed and never returned to the vehicle. This can result in first responders heading out into dangerous situations without a full complement of the equipment needed to meet a particular emergency.

In addition to the above, most vehicles include an on-board diagnostic (OBD) systems that may provide information about the condition of one or more parts of a vehicle. The OBD systems may provide error codes or other types of codes that may be useful to a mechanic or other person monitoring the condition of the important parts of a vehicle for maintenance and safety purposes. However, lacking from the existing technology is a means for sharing such relevant information with a central command center, such as dispatch control, a fleet management center, or some other location.

Accordingly, it would be desirable to have an automated means for sharing relevant information with a central command center, such as dispatch control, a fleet management center, or some other remote location about the actions of a driver and/or control functions being executed by auxiliary equipment attached to a vehicle, and in particular, special purpose vehicles, such as police cars, fire trucks, emergency vehicles, or the like.

Additionally, it would be desirable to be able to track equipment necessary to the operations of the driver or occupants of the vehicle (e.g. traffic cones, weapons, medical gear, etc.) to determine whether the equipment is located within a vehicle or not. Furthermore, it would be desirable to have a means for notifying the dispatch control center, fleet management center, or some other location about the status of the vehicle by sharing any information obtained via the OBD systems of the vehicles.

SUMMARY

According to an embodiment of the invention, an autonomous communication and control system (ACCS) is provided for controlling auxiliary equipment associated with a vehicle. The autonomous communication and control system may include a control unit, an output relay module and a network server. The controller includes an interface for receiving input commands from an occupant of the vehicle for taking control actions relating to the auxiliary equipment. The output relay module is in communication with the controller and is adapted to execute control actions relating to the auxiliary equipment. The controller further includes a communication module that is adapted to autonomously communicate indications of the executed control actions taken with respect to the auxiliary equipment over a communication network. The network server is connected to the communication network and is adapted to receive and log the indications of the executed control actions.

According to another embodiment, a communication system is provided for monitoring the status of a plurality of vehicles within a fleet of vehicles and for selectively transmitting and displaying messages to the occupants of the vehicles. The communication system includes a network server adapted to send and receive information over a communication network. A plurality of control units are each mounted within the vehicles comprising a fleet of vehicles. The control units are adapted to wirelessly access the communication network to send and receive information to and from the network server. The control units include an interface for receiving input commands from and displaying messages to the occupants of the vehicles in which the controllers are installed. The input commands relate to control actions to be taken with respect to auxiliary equipment associated with the vehicles. The control units are adapted to communicate the control actions taken with respect to the auxiliary equipment to the network server.

Yet another embodiment provides for an autonomous communications and control system for controlling auxiliary equipment associated with a vehicle. The system includes a controller having an interface that includes a message display and defines a plurality of programmable user inputs. The inputs are programmable such that each input may be associated with a specific control action to be taken with respect to the auxiliary equipment. A relay output module is in communication with the controller. The output relay is adapted to perform specific control actions with respect to the auxiliary equipment in response to user interactions with the defined user inputs. A wireless transceiver module associated with the controller is adapted to transmit indications of the control actions taken with respect to the auxiliary equipment and to receive messages to be displayed on the message display.

Still another embodiment provides an exemplary method of controlling auxiliary equipment associated with a vehicle and communicating status information about the vehicle and the auxiliary equipment. The method includes providing a controller having an interface. The interface includes a plurality of input buttons adapted for receiving user input commands for controlling the operation of the auxiliary equipment and a display for displaying messages to an occupant of the vehicle. The method further includes providing an output module communicatively coupled to the controller. The output module provides control signals to the auxiliary equipment based on user input commands received by the controller interface. The method further comprises providing a wireless transceiver associated with the controller which is adapted to wirelessly couple the controller to a communication network and network server communicatively coupled to the communication network. The method further calls for receiving a user input command via one of the input buttons and providing a control signal to the auxiliary equipment based on the received user input command. Finally, the method calls for the step of communicating an indication of the control action taken in response to the user input command from the controller to the network server via the communication network.

Other aspects and advantages of the invention will be apparent from the following description and the appended claims.

BRIEF DESCRIPTION OF THE DRAWINGS

FIG. 13 is an example of a fleet management and maintenance client display window for displaying information regarding the status of vehicles in a fleet of vehicles.

DETAILED DESCRIPTION

Figure 1:
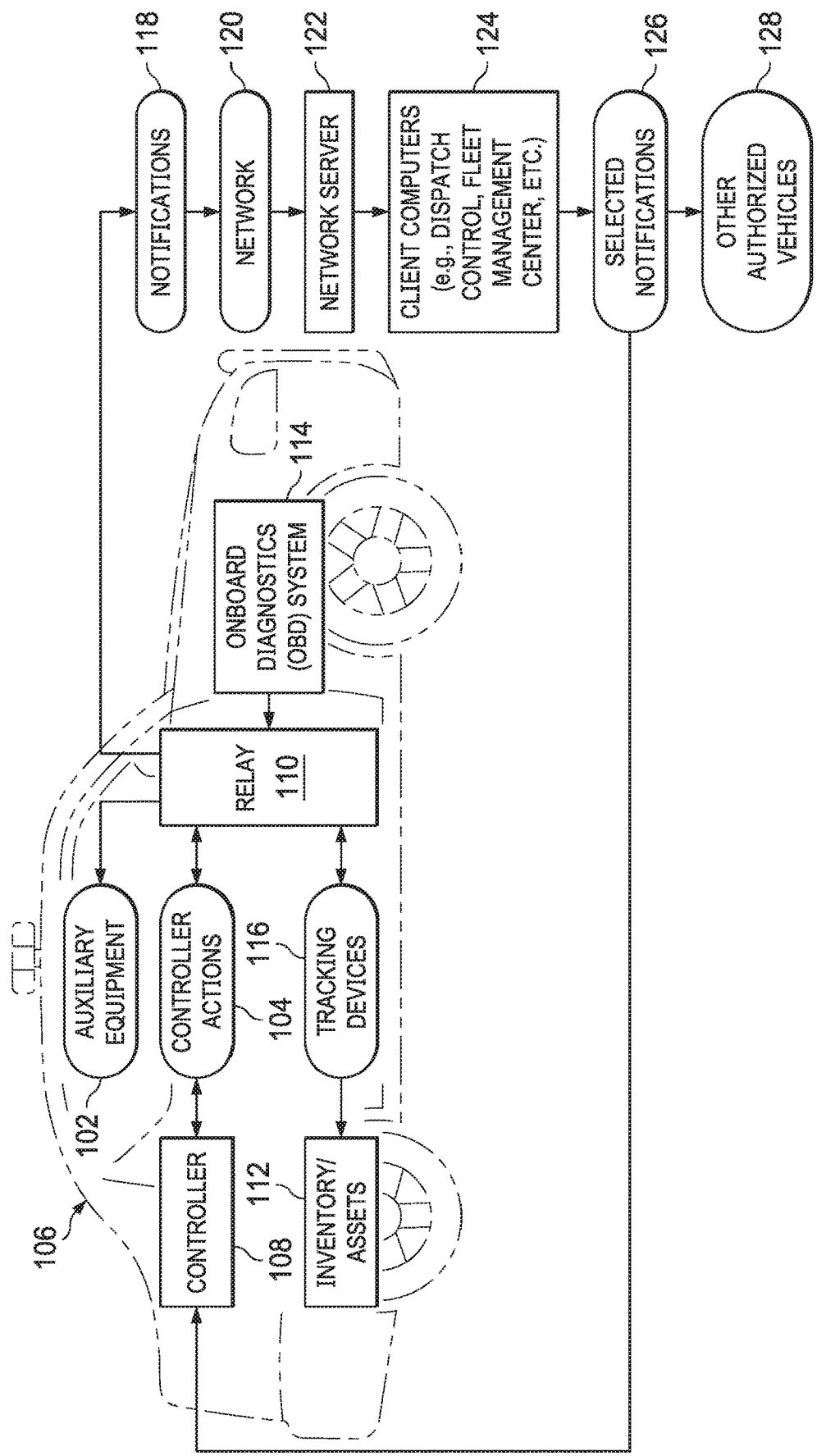
FIG. 1 is a block diagram of an exemplary system overview of an ACCS controller and relay module with relevant components of the system in accordance with an illustrative embodiment.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . "

As a preface to the detailed description, it should be noted that, as used in this specification, the singular forms "a", "an", and "the" included plural referents, unless the context clearly dictates otherwise.

Many vehicles, especially special purpose vehicles such as police cars, fire trucks, ambulances and the like, are outfitted with auxiliary equipment that allows the vehicles to better perform their specialized tasks. Police, fire, and emergency medical services (EMS) vehicles all typically include a variety of lights and audio equipment, including but not limited to, light bars, deck and dash lights, perimeter lights, light sticks, speakers, sirens, and the like. Flashing lights and sirens may be used to warn the public that some sort of emergency is occurring and that other vehicles should make way to allow the emergency vehicle to pass or move over to avoid the scene of an accident. Emergency vehicles may also have public address systems for communicating with the public, radios, data terminals, laptops, and/or tablets (or other similar devices) used to connect to a network in order to communicate with other vehicles, a dispatch control center, a fleet management center, or some other location. Controlling all of the different equipment and systems on an emergency vehicle can be distracting, especially when the vehicle occupant's attention is rightfully focused on dealing with the emergency at hand. A single centralized control unit for controlling all or most of the disparate auxiliary equipment on a vehicle is much to be desired.

In emergency situations there are usually a lot of things taking place all at once. An emergency responder, be it a police officer, fireman, paramedic or other first responder, must act and react quickly to events as they unfold. Even though they are typically equipped with radios, first responders may not have the time or the ability to communicate everything that is happening in a given situation to their colleagues or to their local dispatch center. Nonetheless, any information that may be communicated to other first responders and to the dispatch center can be a great help in allocating appropriate resources, providing backup, and the like. For example, an officer engaged in a high speed pursuit may be too busy driving to radio in the particulars of his or her circumstances, but knowing that the officer has turned on his or her squad car's flashing lights and has accelerated to a high rate of speed may be sufficient for a dispatcher to infer that the officer is engaged in a high speed chase and order backup units to the officer's location. The benefits of a central control unit for controlling auxiliary equipment that is capable of communicating the status of the auxiliary equipment on the vehicle as well as the state of other operating parameters of the vehicle are clear.

In addition to allocating resources and ordering backup personnel, communicating information regarding the status of a vehicle can be invaluable for purposes of managing and maintaining a large fleet of such vehicles. Based on near real-time analysis of the operating parameters from the vehicles in a large fleet of vehicles, preventative maintenance and repairs can be efficiently scheduled for individual vehicles without having a significant negative impact on the readiness of the entire fleet.

In addition to the auxiliary equipment mounted on the vehicle, emergency vehicles are generally stocked with a large amount of removable equipment. Police cruisers may carry traffic cones, flairs, reflective warning signs, first aid kits, flashlights, blankets, rifles, shot guns and more. Fire trucks and ambulances can be loaded with even more removable equipment. As these items are removable, it often occurs that they are removed and never returned the vehicle. This can result in first responders heading out into dangerous situations without a full complement of the equipment needed to meet a particular emergency. Tracking such equipment to ensure that all of the necessary equipment is loaded onto the vehicle before the vehicle is taken out on patrol or responds to a call is time consuming and can lead to delayed response times. An autonomous mechanism for ensuring that all required equipment is present onboard the vehicle is much to be desired.

While the emphasis in this disclosure is on auxiliary equipment associated with emergency response vehicles, it should be noted that auxiliary equipment may also be mounted on commercial and civilian vehicles as well. Construction vehicles, tow trucks, and other vehicles often include rotating yellow hazard lights and other warning signals. Civilian cars may be outfitted with extra running lights, and the like. All vehicles implementing auxiliary equipment may benefit from a central control module for operating such equipment and communicating information about the state of the auxiliary equipment and the state of the vehicle to a remote location or another vehicle.

For purposes of the present disclosure the term "vehicle" should be construed as any mechanical mode of transportation. Vehicles may include road vehicles, off road vehicles, wheeled vehicles, tracked vehicles, two-wheeled or three-wheeled vehicles, water vehicles, snow vehicles, and any other means of conveyance. The invention is especially well adapted for use in emergency vehicles such as police, fire and emergency medical service (EMS) vehicles, but may also be used in commercial settings such as construction, roadside service, and the like, and non-commercial settings as well.

Turning to FIG. 1, FIG. 1 is a block diagram of an exemplary system that may be referred to as an autonomous communication and control (ACCS) system. The exemplary ACCS system includes a controller, such as controller 108 and a relay module, such as relay module 110. Controller 108 and relay module 110 may be attached or otherwise located within vehicle 106. FIG. 1 includes auxiliary equipment 102. Auxiliary equipment as used herein refers to any equipment that has been added to a vehicle to provide additional functionality beyond that provided by the original manufacturer, and may be located anywhere in or on a vehicle. Emergency vehicles such as police, fire, and EMS vehicles often require additional visual and acoustic devices such as flashing lights, spot lights, sirens and public address loud speakers for assisting police officers, firemen, and paramedics in performing their duties. Commercial vehicles such as trucks used for construction and emergency roadside assistance also require warning lights and other safety equipment. Civilian drivers, as well, often attach aftermarket lighting systems to their cars and trucks to increase the visual distinctiveness of their vehicles. Thus, auxiliary equipment 102 may include, but is not limited to, deck lights, dash lights, grille and surface mounted lights, light bars, light sticks, traffic advisors, hideaway/surface mounts, beacons, sirens, speakers, work lights, scene lights, running board lights, switch boxes and controllers. As stated above, auxiliary equipment 102 may be any type of equipment useful to a vehicle, whether the vehicle is utilized for special purposes, such as by police, fire, and EMS vehicles, or by private civilians.

The present embodiments recognize that there are a variety of scenarios where vehicles may need a fast and direct manner for communicating relevant information regarding either an action taken by a driver or other occupant of a vehicle as well as information about the conditions and status of a vehicle. Such embodiments may be particularly of interest and relevance in the day to day activities of law enforcement, fire, medical, and other types of first responders and emergency personnel who regularly must communicate with each other and with a dispatch office to keep these parties informed about their activities and their whereabouts.

One or more exemplary embodiments described herein relates to an autonomous communication and control system (ACCS) which allows a vehicle occupant to take various control actions or control functions 104 with respect to auxiliary equipment associated with the vehicle, such as turning on and off a flashing light pattern on the vehicles roof mounted light bar, turning on and off a siren, making announcements through the vehicle's public address system, and the like. Such control actions 104 may be entered into the controller 108 by an occupant of the vehicle and are carried out by the relay outputs associated with the relay module 110. An ACCS according to an embodiment is adapted to communicate indications or notifications 118 that such actions have been taken with respect to the auxiliary equipment to a remote ACCS network server 122. The ACCS may also be configured to communicate indications or notifications 118 of other actions taken by a vehicle occupant such as releasing a trigger lock on a weapon associated with the vehicle, opening a canine (K-9) cage door to release a service dog into the field, and the like, to name a few example actions.

One or more exemplary embodiments may also provide an ACCS capable of accessing and monitoring various vehicle operating parameters and diagnostic codes via the onboard diagnostics system (OBD) 114 system in vehicle 106 and communicating such information to one or more remote ACCS servers (e.g. network server 122) for maintenance and fleet management purposes. Further, one or more exemplary embodiments may relate to an ACCS that includes a real-time location system for tracking an inventory of removable assets, such as inventory/assets 112 shown in FIG. 1, that form a part of the complete inventory of tools and equipment with which the vehicle is intended to be outfitted. One or more tracking devices 116 may be attached to each asset 112 so that a user of controller 108 may be notified whether inventory/asset 112 is present or located within his or her vehicle 106. This may be helpful so that the driver or other user can be sure that he or she has any necessary equipment within his or her vehicle in order to do his or her work. Inventory/assets 112 may be any type of equipment useful to a driver or occupant of a vehicle whether for their occupation or for some other purpose. Further, inventory/asset 112 may be a piece of equipment that is capable of being removed from the vehicle. Some non-limiting examples of inventory/assets 112 include traffic cones, mats, blankets, first aid kits, medical equipment, tools, tool kits, etc. In one or more embodiments, tracking devices 116 may be connected to relay 110. In one embodiment, tracking devices 116 may be connected to relay 110 through one or more Registered Jack (RJ) plug connectors or via any other means of connection known to a skilled person in the art.

The ACCS integrates a number of control and communications functions into a single controller, such as controller 108, which may be mounted within a vehicle, such as vehicle 106. Controller 108 may provide an interface that allows an occupant of vehicle 106 to control various auxiliary equipment 102 mounted on or within the vehicle. The controller 108 is configured to communicate with a separate relay module, such as relay module 110, that is also mounted on or within vehicle 106. The relay module 110 acts as a switch, providing control outputs to the various auxiliary equipment mounted on or inside the vehicle in response to user commands received by the controller 108 and other inputs hardwired to the relay 110. In addition to controlling the operation of the auxiliary equipment 102, the controller 108 is adapted to communicate various data in the form of notifications 118 (which may include raw data) regarding the status of the vehicle 106 and the auxiliary equipment 102 mounted thereon to a network server, such as network server 122. Notifications 118 regarding control actions taken with respect to the auxiliary equipment 102 may be pushed to the network server 122 in near real-time. Similarly, data regarding the status of the vehicle may be continuously streamed over the network 120 to the network server 122.

One or more front-end client computers 124 may access the network server 122 to selectively view data about vehicle 106 and the auxiliary equipment 102 mounted on or within the vehicle 106. The front-end client computer 122 may comprise a general purpose computer having a processor and a memory along with software instructions stored in the memory. When executed by the processor, the software instructions allow the computer to access information and services provided by the network server 122 over the network 120. In one embodiment, the one or more front-end computers 124 may be associated with a dispatch control center, a fleet management/maintenance center, or the like. In a specific embodiment, the one or more front-end computers 124 may be configured to obtain data (i.e. notifications 118) about auxiliary equipment 102 and which control functions 104 have been executed via controller 108 as well as other relevant data regarding the operating condition or environmental conditions of vehicle 106. In a specific embodiment, the notifications 118 or data provided from the controller 108 and relay 110 may be transferred via a network, such as network 120 to a network server, such as network server 122. The network server 122 may be adapted to make the data available to one or more front-end client computers 124, as shown in FIG. 1. Alternatively, over specific increments of time, the data may be automatically transferred to the one or more front-end client computers 124 for sorting and review by personnel monitoring the one or more front-end client computers 124.

Data communicated to a front-end client computer 124 associated with a dispatch control center and nearby vehicles may be used to assist a dispatcher and the occupants of the other vehicles in evaluating a situation encountered by occupants of the first vehicle, and making decisions regarding the deployment of additional resources, sounding additional alarms, and the like. An exemplary ACCS as shown herein may help dispatch control centers to monitor the many vehicles and drivers assigned to their care. For law enforcement, it may be very desirable to have such an ACCS that can share in real time the status and conditions of each police car or other type of first responder vehicle that dispatch control is monitoring. The same is true for fire departments and even paramedics or other emergency medical services groups.

Another advantage offered by the one or more described embodiments is that selected notifications 126 that contain relevant information about the vehicle 106 may be shared with other authorized vehicles 128. The front-end client computer 124 may be monitored by a person at, for example, a dispatch control center. This individual may determine which notifications 118 received by the front-end client computer 124 should be included within the group of selected notifications 126 that are shared with the other authorized vehicles 128. The other authorized vehicles 128 may be vehicles that are part of the same team, agency, or entity whose drivers and occupants may benefit from the autonomous method of sharing relevant data about each other's status or condition. The selected notifications 126 may comprise one or more notifications received from the controller of a first vehicle, such as vehicle 106, which may be selectively parsed by personnel or equipment associated with the dispatch control center and selectively forwarded to the other authorized vehicles. Furthermore, the selected notifications 126 may include data worthy of sharing or sending back to be displayed on the display screen of controller 108 for vehicle 106 itself. It may be the case that dispatch control is able to edit or summarize the data provided from vehicle 106 in such a manner that is easier to comprehend when displayed on controller 108 to one or more users. Accordingly, it is provided for in the present description that controller 108 may include one or more display screens. Each authorized vehicle of the other authorized vehicles 128 is intended to have the same controller 108 and relay 110 so as to be able to communicate its notifications (i.e. updates, data, relevant information regarding auxiliary equipment 102 or conditions within vehicle 106 based on data obtained from OBD system 114) to the network server 122 over the network 120, which may then be retrieved by one or more front-end client computers 124. In a preferred embodiment, the front-end client computer 124 is a dispatch control client tasked with monitoring a designated, unified fleet of vehicles that share a united purpose, such as law enforcement, fire departments, paramedics, EMS, or other first responders.

As shown in FIG. 1, in one embodiment of the present invention, the controller 108 and relay 110 may also obtain data about the operating condition of vehicle 106 itself by accessing and connecting to the OBD system 114 of vehicle 106. Most modern vehicles have an OBD system, such as OBD system 114. The OBD system 114 is a self-diagnostic and monitoring system in vehicle 106 that provides an overview of the operation and condition of a vehicle's subsystems. The OBD system 114 may provide error or trouble codes or other data helpful to understand what type of maintenance may be required to keep vehicle 106 in good shape. Therefore, it is an intention of one or more embodiments described herein to be able to access this data provided by the OBD system 114 of vehicle 106 and share this data in the form of notifications 118 with one or more front-end client computers 124. It may be highly advantageous for a dispatch control or a fleet management center to have access to the diagnostic information and data provided by the OBD system 114 of vehicle 106 in order to stay on top of the maintenance of vehicle 106 and the other vehicles in the fleet. In one embodiment, relay module 110 may include a CAN Bus that may be connected to one or more ports associated with the OBD system 114. Any data provided from the OBD system 114 may be obtained by controller 108 and may be transmitted to the network server 122. This data may be accessed by a front-end client computer 124 and may be used for fleet management and maintenance purposes.

As discussed briefly above, the ACCS may also implement a real-time location system including an RFID or UWB chip reader or the like, for maintaining an inventory of removable assets, such as inventory/assets 112, that are intended to be stored on or within vehicle 106. In one embodiment, information regarding the inventory of removable items (i.e. assets 112) located within the vehicle may be displayed on a display screen or other interface on controller 108 for the occupants of vehicle 106 so that they might be replenished before the vehicle is taken out on patrol or is in motion for some other purpose. Information regarding the inventory may also be communicated to the ACCS network server for similar reasons. Further detailed embodiments for an exemplary ACCS system is provided below in reference to the Figures presented herein.

Figure 2:
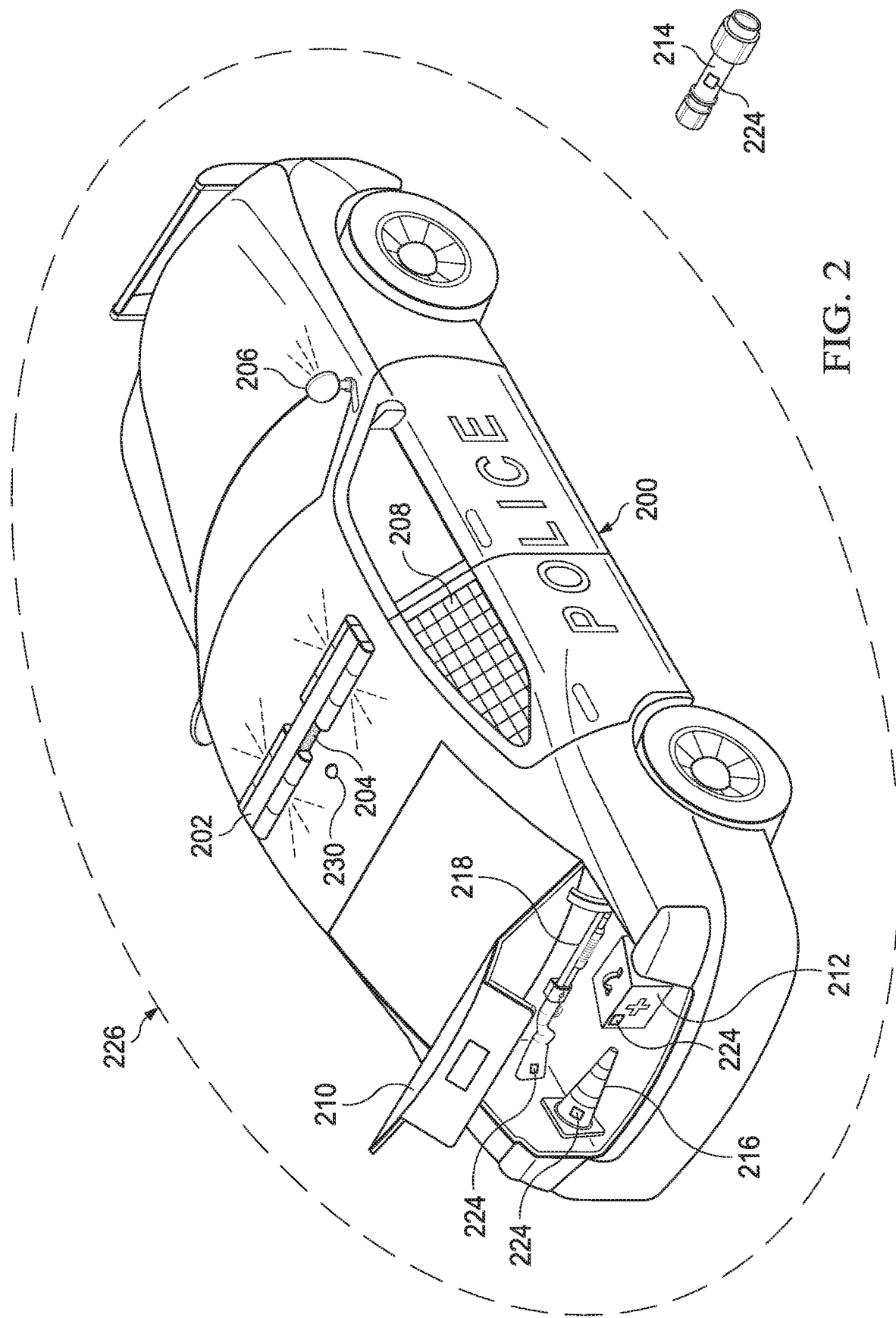
FIG. 2 is a perspective view of a police squad car including sample auxiliary equipment and removable assets in accordance with an illustrative embodiment.

Turning to FIG. 2, FIG. 2 shows a vehicle 200. In FIG. 2, the vehicle 200 appears as a police vehicle, but could also be a fire department vehicle, an emergency medical services vehicle, a road construction vehicle, a commercial vehicle, a civilian vehicle, or some other vehicle. Vehicle 200 may be the same as vehicle 106 in FIG. 1.

The vehicle 200 includes an array of auxiliary equipment (such as auxiliary equipment 102 in FIG. 1) and removable assets (such as inventory/assets 112 in FIG. 1) that may be associated with a typical emergency vehicle. In this exemplary illustration, the auxiliary equipment (which may be an example of some types of auxiliary equipment 102) mounted directly to the vehicle 200 includes a roof mounted light bar 202, a public address loudspeaker/siren 204, and a side mounted spotlight 206. A K-9 cage 208 is included within the vehicle for transporting a service dog. A weapons locker 210 is stored in the trunk of the vehicle 200. Also shown in FIG. 2 are a number of removable assets (e.g. removable assets 112) that may be stored and/or transported in the vehicle 200 and which an officer may regularly rely on during the course of performing his or her duties. The exemplary removable assets shown in FIG. 2 include a first aid kit 212, a flashlight 214, a traffic cone 216, and a shotgun 218. These items are representative only. The removable assets carried by an actual police/emergency vehicle/or any other type of desired vehicle may vary from those shown in FIG. 2 and may include any type of removeable asset that may be useful to the driver of the vehicle.

As further described below with respect to FIG. 10, in one or more embodiments, tracking devices, such as tracking chips may be affixed or attached (either permanently or temporarily) to the removeable assets so that their location may be known to the drivers and occupants of vehicle 200. Thus, it may be possible using tracking devices such as UWB chips or other types of tracking technology to display to a user on the touchscreen other type of display screen of a controller in accordance with controller 108 that the removeable asset is present and found within the vehicle.

Some of the equipment mounted on the vehicle 200 such as the light bar 202, the public address speaker/siren 204, and the side mounted spotlight 206 are typically activated by one or more control switches mounted within the vehicle from a controller. Other equipment such as the K-9 cage and the gun lock 210 may be operated manually by a police officer, but may include switches that indicate, for example, that the K-9 cage door has been opened or that the weapons locker has been unlocked.

Figure 3:
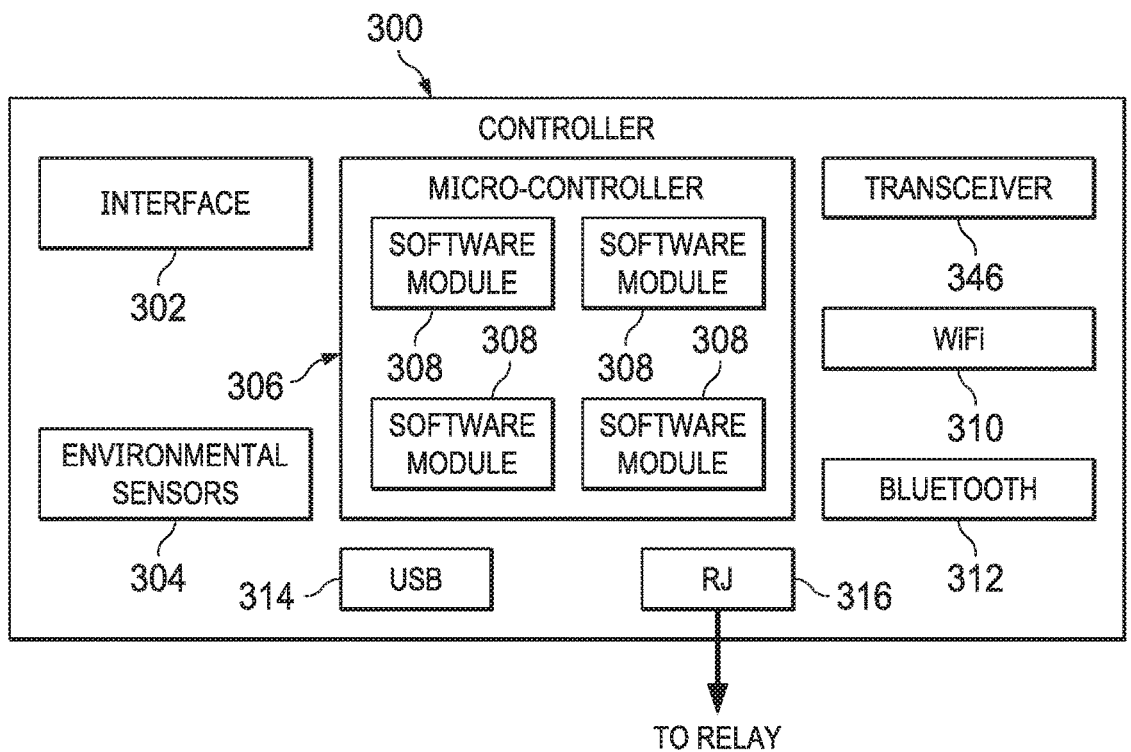
FIG. 3 is a block diagram of an ACCS controller according to an illustrative embodiment.
Figure 4:
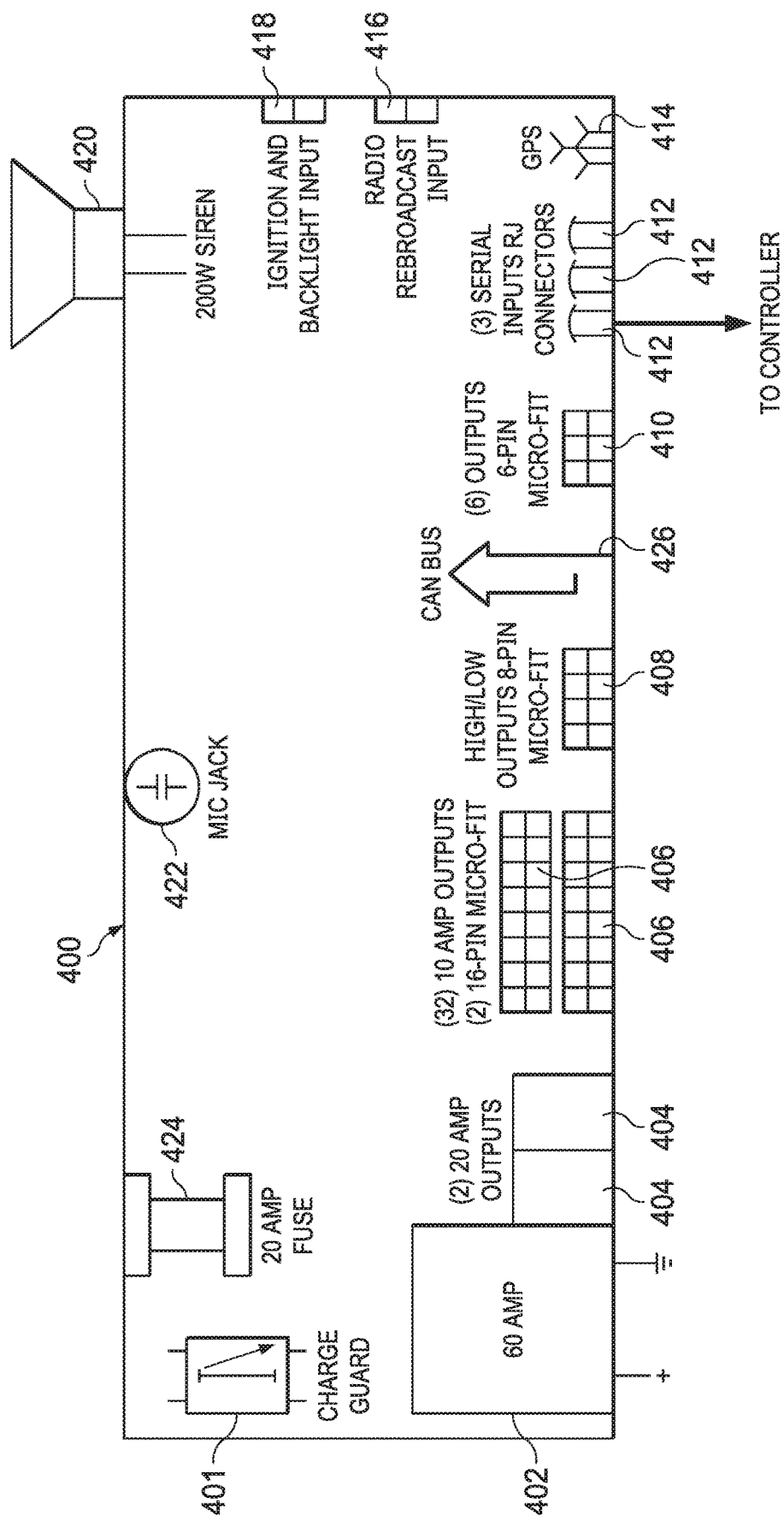
FIG. 4 is an input/output diagram of an ACCS relay module according to an illustrative embodiment of the invention.

Turning to FIGS. 3 and 4, an exemplary embodiment of an ACCS includes both a controller 300 and an output relay module 400. Controller 300 and output relay module 400 may operate in accordance with controller 108 and relay module 110 shown and described above with respect to FIG. 1. Controller 300 may be mounted anywhere that is suitable within a vehicle. It may be desirable to mount controller 300 near or on the dashboard area of a vehicle where it may be easily accessed by the officer or other type of driver driving the vehicle, or his or her partner riding along in the passenger seat. The controller 300 and/or relay module 400 may be attached using any means of attachment to a surface of a vehicle known to those of ordinary skill in the art including using brackets, screws, adhesive, mounting devices, or any other desired means.

As will be described in more detail below, the controller 300 includes an interface 302 that allows a vehicle occupant to control the various auxiliary equipment (e.g. auxiliary equipment 102) associated with the vehicle. The relay module 400 may be located anywhere within or on a vehicle that is suitable. It may be useful in some scenarios for relay module 400 to be mounted underneath the vehicle's dashboard where it has more convenient access to the vehicle's fuse box and electrical system. The relay module 400 provides control signals and/or operating power to the auxiliary equipment for powering and controlling the auxiliary equipment.

FIG. 3 is a functional, exemplary block diagram of the controller 300. The functional elements of the controller 300 include an interface 302, a plurality of environmental sensors 304, a micro controller 306, a memory 307 storing a plurality of software modules adapted to be executed by the microcontroller 306, a transceiver 346, a Wi-Fi communications module 310, a Bluetooth communications module 312, at least one or more USB port 314 and at least one or more serial communications port with an RJ style connector 316. The interface 302 will be described in more detail in relation to FIG. 4, but for the present discussion it should be noted that the interface includes a plurality of programmable buttons for activating and deactivating various functions associated with the auxiliary equipment mounted on the vehicle and a display area for displaying messages and notifications to the occupants of the vehicle. It is noted that controller 300 may include any number or type of sensors known in the art and is not limited to including solely environmental sensors 304.

The microcontroller 306 executes the software modules 308 to control the auxiliary equipment, monitor the inventory of removable equipment (i.e. removeable assets 112 in FIG. 1 and those exemplary removable assets shown in FIG. 2), display various information on the display screen, and communicate with a remote network server such as network server 122 in FIG. 1. The Wi-Fi communications module 310 allows the controller to communicate with other devices over a Wi-Fi network, and according to one or more embodiments, may act as a Wi-Fi "hot spot" to provide network access via a cellular communication link. Similarly, the Bluetooth module 312 allows the controller 300 to wirelessly access, control and share information with other Bluetooth enabled devices within or near a vehicle, such as vehicle 200 in FIG. 2. The USB port 314 allows a laptop computer or other type of computing device to be connected to controller 300 for programming the operation of the controller 300 and/or receiving data received or accessed by the controller 300. Further, the RJ connector serial output port 316 allows the controller to be operationally coupled to the relay module 400. Those of ordinary skill in the art understand that additional components may be added or omitted from controller 300.

FIG. 4 shows the various inputs and outputs associated with relay module 400 according to an exemplary embodiment. Those of ordinary skill in the art understand that additional components may be added or omitted from relay 400. In one embodiment, relay 400 may be wired to a vehicle's electrical system. In one embodiment, relay 300 may be protected by a 60 amp fuse. In an embodiment, relay 400 may include an ignition and blacklight input 418, which may be a trigger wire that may turn relay 400 on and off when the vehicle in which relay 400 is located is turned on and off.

A charge guard switch unit 401 may be optionally provided to shut down relay module 400 and the equipment controlled thereby if the vehicle ignition and backlight input 418 indicates that the vehicle has been shut off for an extended period of time. In the exemplary embodiment of relay module 400 shown in FIG. 4, a pair of 20 amp fuses 424 are provided to protect a pair of 20 amp outputs 404. Thirty-two individually fused outputs are provided in the form of two 16-pin micro-fit connectors 406. Eight high/low outputs are provided in an 8-pin micro-fit connector 408. Six digital inputs are provided in the form of a 6-pin micro-fit connector 410. It is to be understood that more or less of any of these components may be provided in alternative embodiments of relay module 400.

As shown in FIG. 4, a radio rebroadcast input 416 is also provided with relay module 400. A radio rebroadcast input 416 may be useful for transmitting public service announcements (PSAs), emergency broadcast messages, and other sounds or notifications that first responder vehicles, such as police vehicles, often transmit via one or more speakers and emergency sirens.

In an embodiment, relay 400 may further include one or more serial ports that are provided in FIG. 4 in the form of three female RJ connectors 412. A Controller Area Network (CAN) bus connection 426 is provided for accessing the vehicle's CAN bus to allow the ACCS to receive operational data and diagnostic codes from the vehicle's On-Board Diagnostic (OBD) system (see FIG. 7). The relay module 400 further includes a 200W siren output 420, a microphone jack 428, and a GPS module 414. As mentioned above, the relay module 400 may be communicatively connected to the controller 300 via a serial connection using one of the RJ serial ports 412, for example.

Figure 5:
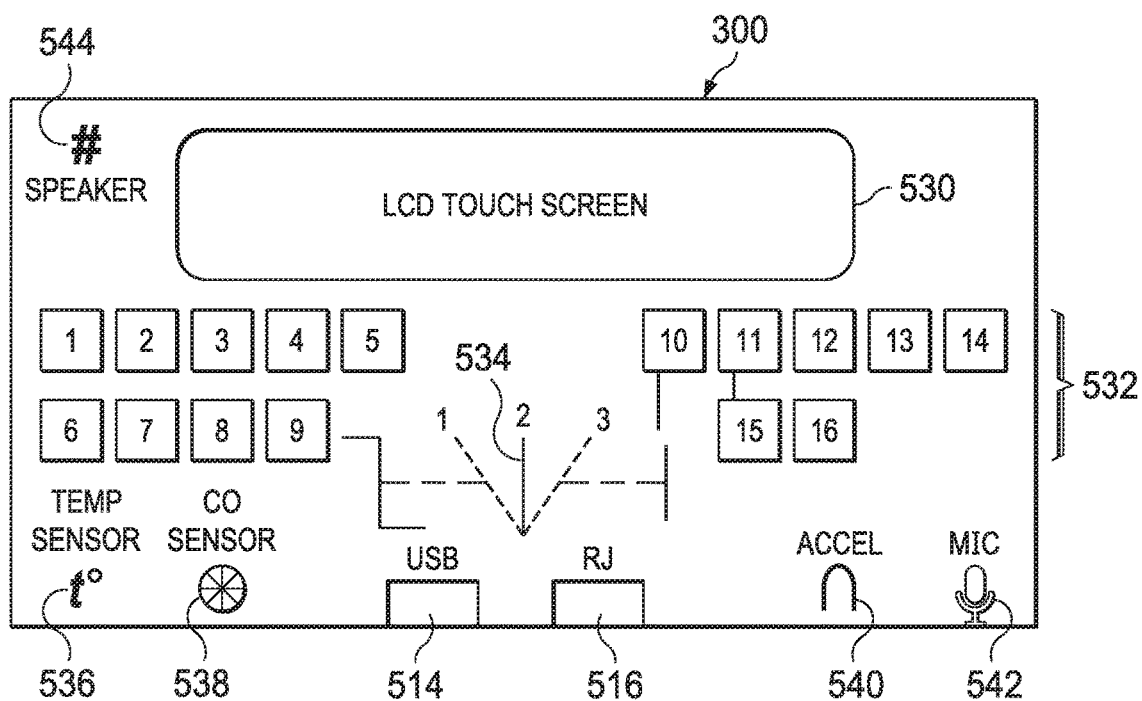
FIG. 5 is an illustration of an ACCS controller interface according to an embodiment of the invention.

User commands may be received using one or more selectors on controller 300 and messages may be displayed by the controller interface 302 shown in FIG. 3. User commands may also be entered on one or more display screens on controller 300, such as display screen 530 shown in FIG. 5. In one embodiment, the controller interface 302 may be a single touchscreen panel having a distinct message display area and a plurality of interactive touch screen buttons. Alternatively, the controller interface 302 may comprise a combination of a touch screen message display area 530 and a plurality of programmable tactile push buttons 532 as shown in FIG. 5. In one embodiment, touchscreen 530 may be an LCD touchscreen, but other types of touchscreen known in the art may be utilized as well. The touchscreen 530 is configured to display information and messages about the status of the vehicle, the auxiliary equipment (e.g. auxiliary equipment 102) associated with the vehicle, as well as messages and information received from a remote ACCS network server (e.g. network server 122 in FIG. 1) or client computer (e.g. client computer 124 in FIG. 1). The messages or notifications received from the ACCS server may include messages originating from other vehicles within a fleet of vehicles, a dispatch control center, a fleet maintenance and management center, or some other central facility associated with the vehicle and the ACCS system. The touchscreen 530 allows an occupant of the vehicle in which the controller 300 is installed to navigate through menus and scroll through messages to receive information pertinent to carrying out his or her duties.

FIG. 5 is a pictorial illustration showing an exemplary frontside view of a controller, such as controller 300 of FIG. 3. According to a non-limiting embodiment, the interface 302 of FIG. 3 may further include sixteen programmable pushbuttons, such as those pushbuttons 532 shown in FIG. 5 and a three position selector switch, such as three position selector switch 534. The push buttons 532 and the three position selector switch 534 may be programmed using programming software executed on an external computer such as a laptop, tablet computer, smartphone, or the like, connected to the controller 300 via the USB port 314 or 514.

The pushbuttons 532 and the three positions selector switch 534 may be programmed to control the various outputs of a relay module such as the relay module 400 shown in FIG. 400. The output relays included in the relay module are in turn hardwired to the various auxiliary equipment mounted on or otherwise associated with the vehicle in which the controller and relay are located. Thus, the auxiliary equipment may be controlled directly by the various programmable pushbuttons that form a part of the controller interface. For example, pushbutton 1 may be programmed to turn on a first output relay; pushbutton 2 may be programmed to turn on a second output relay, and so forth. The first output relay may in turn be hardwired to a first piece of auxiliary equipment; the second output relay may by hardwired to a second piece of auxiliary equipment, and so on, such that the first piece of auxiliary equipment is controlled by the first programmable pushbutton, and the second piece of equipment is controlled by the second programmable pushbutton. Alternatively, various output relays may be hardwired to different inputs on the same piece of auxiliary equipment. When wired in this manner, the various pushbuttons programmed to turn on the corresponding relays may be used to select different operating modes for the particular piece of auxiliary equipment to which the relays are connected. For example, the first output relay on the relay module may be hardwired to a first input of a light bar. The first input of the light bar may be provided for selecting a first mode of operation characterized by a first flashing light pattern. The second output relay on the relay module may be hardwired to a second input of the light bar. The second light bar input may be provided for selecting a second mode of operation characterized by a second flashing light pattern. With the pushbuttons programmed in this manner, and the output relays of the relay module wired in this way, the first pushbutton may be selected to implement the first operating mode with the first flashing light output pattern, while the second pushbutton may be selected to initiate the second operating mode with the second flashing light output pattern.

During the programming process the outputs wired to the relay may be given specific meanings as well. For example, a first one of the six outputs 410 may be hard wired to a trigger lock release associated with a police officer's sidearm. Another may be associated with the cage door sensor on the K-9 cage door. Another may be associated with the weapons locker in the trunk of the vehicle, and so forth. A voltage signal present on one of these inputs may be programmed to indicate that an officer has released the trigger lock on his or her weapon or unlocked the weapons locker in the trunk of the car. The inputs may be programmed to initiate additional control functions with respect to the auxiliary equipment, or they may be provided for merely informational purposes.

Controller 300 may also include a number of environmental sensors 304. These non-limiting, exemplary environmental sensors may include a temperature sensor 536, a carbon monoxide sensor 538, and an inertial measurement unit (IMU) 540 which includes multi-axis accelerometers and gyroscopes for providing precise information regarding the orientation and motion of the vehicle as shown in FIG. 5. Collectively, the environmental sensors 304 gather critical data regarding the environment in and around the vehicle. This and other information regarding the status of the vehicle and the auxiliary equipment (e.g. auxiliary equipment 102) associated therewith may be transmitted to nearby vehicles and to a dispatch control center that may be critical to understanding the situation the occupant of the vehicle is facing. For example, accelerometer data from the IMU 540 may indicate that the vehicle has been in an accident; gyroscopic information may indicate that the vehicle has been involved in a roll-over accident. Temperature readings could indicate the presence of a fire, or unsafe conditions in the vehicle for a K-9 service animal left in the vehicle, and so forth. All of this data and indicia about the vehicle may be highly useful and desirable to a dispatch control center and other vehicles within a fleet in order to stay on top of any difficult or challenging situations for any one of their vehicles as well as to monitor them.

Further in reference to FIG. 3 and FIG. 5, an exemplary controller 300 and interface 302 may include a microphone, such as microphone 542 for receiving audio input from an occupant of the vehicle, as well as a speaker 544 for broadcasting audio messages to an occupant of the vehicle. In an embodiment, voice commands received by the microphone may be programmed to initiate control functions in lieu of the programmed pushbuttons.

A feature of the ACCS of the present description is that the controller 300 is adapted to autonomously communicate information from the vehicle to a remote ACCS network server (e.g. such as network server 122) and to receive messages from the server to be displayed on the touchscreen display 530. The information transmitted by the controller 300 may include, but is not limited to, indications of control actions taken by an occupant of the vehicle with respect to auxiliary equipment associated with the vehicle, the input status of the various other equipment wired to the relay outputs 410, temperature measurements from the temperature sensor 536, carbon monoxide readings from the carbon monoxide (CO) sensor 538, motion readings from the IMU sensor 540, vehicle location information from the GPS unit 414, vehicle operation and maintenance parameters and diagnostic codes received from the vehicle's OBD system via the CAN bus port 426, and tracking information from device tags attached to various removable assets received from a real-time location system connected to one of the relay serial ports 412. This list is illustrative only and is not intended to be exhaustive.

Figure 6:
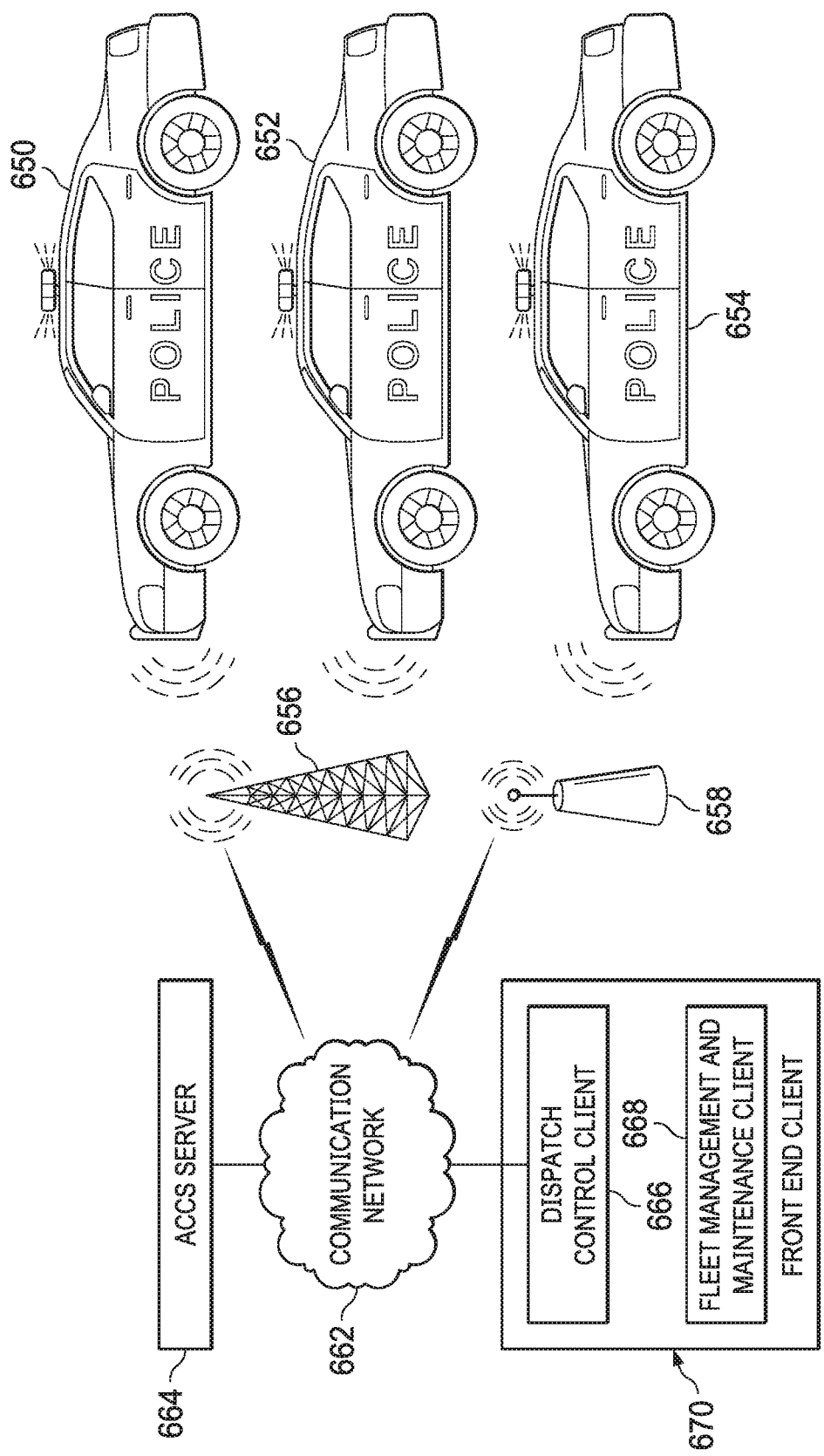
FIG. 6 is an illustration of an ACCS communication network according to an embodiment of the invention.

Turning to FIG. 6, FIG. 6 illustrates an exemplary communication path for data transmitted to and from ACCS controllers (e.g. such as controller 108 from FIG. 1 and controller 300 in FIG. 3) that are installed in a plurality of vehicles within a fleet of vehicles. The term "fleet" as used herein may refer to a set of vehicles that belong to a common entity or share a common purpose. Again, the vehicles 650, 652, and 654 are depicted in FIG. 5 as police cars, but they could just as well be fire trucks, ambulances, construction vehicles, commercial vehicles, civilian vehicles, or the like. In FIG. 6, a first vehicle 650 is equipped with an ACCS controller 300 and relay 400 to control various auxiliary equipment that may be installed on vehicle 650. Such auxiliary equipment is connected to relay 400 and to ACCS controller 300 as described above with respect to FIGS. 3, 4, and 5 and may be activated and controlled using ACCS controller 300. Likewise, in FIG. 6, a second vehicle 652 and a third vehicle 654 are similarly equipped. The controllers 300 and relay modules 400 mounted in the vehicles 650, 652, and 654 are each adapted to wirelessly access a communication network 662. Communication network 662 may include a cellular communication link 656, a Wi-Fi communication link 658, or some other wireless communication link in order for data to be transferred and shared from the controllers 300 and/or relay modules 400 that are installed in vehicles 650, 652, and 654 to their designated remote locations. Depending on the appropriate connection available, the data transferred from the controllers 300 and/or relay module 400 may be selectively shared over any of the communication links listed above, including a cellular communication 656, a Wi-Fi communication 658, a Bluetooth connection 660, or some other wireless communication link. In one embodiment, an ACCS network server 664 is connected to the communication network 662. Data transmissions from the controllers 300 mounted in the vehicles 650, 652, 654 are directed to the ACCS network server 664 where they are received and logged.

The information transmitted from the controllers 300 located in vehicles 650, 652, and 654 may include indications of the control actions or functions taken with respect to the auxiliary equipment mounted on the vehicles. For example, if an occupant of the first vehicle 650 presses pushbutton 1 on the controller 300, and pushbutton 1 has been programmed to initiate a first flashing light pattern on a light bar, such as light bar 202 shown in FIG. 2, that may be mounted on the roof of the vehicle, the controller 300 is configured to transmit an indication (may also be referred to as a notification or message) that the vehicle occupant has initiated a flashing light pattern on the roof mounted light bar of vehicle 650 to the ACCS network server 664. This information is then received and stored on the ACCS network server 664 for retrieval by one or more interested parties.

In an exemplary embodiment, a front-end client 670 provides a web portal for accessing notifications and raw data that have been forwarded from the vehicles 650, 652, 654 to the ACCS server 664. The front-end client 670 may include a dispatch control client 666, a fleet management and maintenance client 668, some other front-end client, or some combination of different front-end clients. A dispatch control client may comprise a client computer located, for example, in a dispatch control center associated with a police or fire department, a commercial dispatching office, or some other facility from which a fleet of vehicles is directed. Similarly, a fleet management and maintenance client may comprise a client computer located for example, at a fleet maintenance center or garage operated by an organization or department with which the vehicles 650, 652, 654 are associated. In some cases, the dispatch client and the fleet maintenance and management clients may be executed on a single client computer. In other cases, one or other or both of the of the dispatch and fleet management and maintenance clients may be omitted in favor of a front-end client computer located elsewhere and serving a different purpose.

In one exemplary embodiment, a dispatch control front-end client 666 may be configured to communicate with the ACCS network server 664 over the communication network 662 via the web portal application executed on the front-end client computer 670. A dispatch officer or manager may view the information that has been passed through the ACCS network server 664 and received from the controllers 300 mounted in the various squad cars 650, 652, 654, including the indication that the first car 650 has initiated the first flashing light pattern on the light bar mounted on the first vehicle 650 via the web portal. It may be the case that the first flashing light pattern that is associated with push button 1, as described above, may have a specific meaning within the department. For example, according to department practice, the first flashing light pattern may be employed when officers are making routine traffic stops. A second flashing light pattern may be employed when officers are involved in high speed pursuit, and so forth. In this case, since the use of the first flashing light pattern is used during traffic stops, a dispatch officer, upon seeing the indication that the officer in the first vehicle 350 has initiated the first flashing light pattern on the vehicle's light bar, will know that the officer is making a traffic stop. In this case, the dispatch officer may make note of the officer's action and take no further action.

Taking the above example a step further, according to department practice, a second flashing light pattern may be employed when officers are involved in a high speed pursuit. Pushbutton 2 of the ACCS controller interface 302 may be programmed to initiate this second flashing light pattern on the roof mounted light bar 202. Thus, if an officer driving the first vehicle 650 shown in FIG. 6 engages another vehicle in a high speed chase, the officer may press push button 2 on the controller 300 to initiate the second flashing light pattern on the light bar 202. Again, the controller 300 will transmit an indication that the officer has initiated the second flashing light pattern on the light bar 202 to the ACCS server 664. In many cases, an officer engaged in a high-speed pursuit, may not have the time or the ability to communicate with a dispatcher at the dispatch control center. In this case, a dispatch officer viewing the information received by the ACCS server 664 via a web portal (for example) executed by the dispatch control client 666 will see that the officer has initiated the second flashing light pattern on the light bar 202. The dispatch officer may also see that the vehicle has accelerated to a high rate of speed. From this information the dispatch officer may infer that the officer in the first vehicle 650 is involved in a high-speed pursuit. Equipped with this information, the dispatch officer may take appropriate actions directing other vehicles to support the officer in the first vehicle 650 and also monitor closely the location and progress of first vehicle 650. However, it is to be noted, that it is not required that a particular light pattern from a light bar or other auxiliary equipment be necessarily associated with a particular protocol as to which button or selector located on controller 300 is programmed. The above paragraphs are meant to indicate one of the many possible uses of such a system. Advantageously, the controllers 300 in the vehicles are meant to be customizable and tailored to each department or user of the controllers 300 to program in a manner that is most convenient to them in order to efficiently utilize to activate and control auxiliary equipment.

Other type of information may also be transmitted from the controllers about numerous other auxiliary equipment that may be mounted on or in vehicles 650-654. Further, any type of data may be transmitted about the environmental conditions and temperature within any of the vehicles, which may be obtained from temperature sensor 536 and carbon monoxide sensor 538 as shown for controller 300 in FIG. 5. Further, data transmitted from controllers 300 may include the location, direction, and/or speed of the vehicles to assist dispatch control who is associated with dispatch control client 666 to monitor the vehicles that are included within their fleet.

Returning briefly to FIG. 4, the relay 400 includes at least one port for connecting to the vehicle's Controller Area Network (CAN) bus, shown as CAN bus 426 in FIG. 4. Connecting the vehicle CAN bus 426 to this port may provide access to the vehicle's on-board diagnostic (OBD) system (e.g. OBD system 114 in FIG. 1). The OBD system provides real-time data regarding the operation of various vehicle subsystems along with a standardized set of diagnostic trouble codes (DTCs) that may be used to monitor vehicle performance or identify malfunctions within the vehicle. The OBD system also provides access to operational data measured from various sensors within the vehicle. Information from the OBD system may include for example, tire pressure, emissions sensor readings, break wear, oil temperature, coolant temperature, engine RPM, vehicle speed, and many more. The relay 400 is able to communicate such vehicle operational data to the to the controller 300. In one embodiment, such vehicle operational data may be transferred from relay 400 to controller 300 to be shared over a communications network (such as communications network 662) via one of the serial RJ connector ports 412. As with the indications of control actions taken with respect to the auxiliary equipment, vehicle operational data received from the vehicle's OBD system via the CAN bus 426 may be transmitted wirelessly from the controller 200 to the ACCS network server 664.

Figure 7:
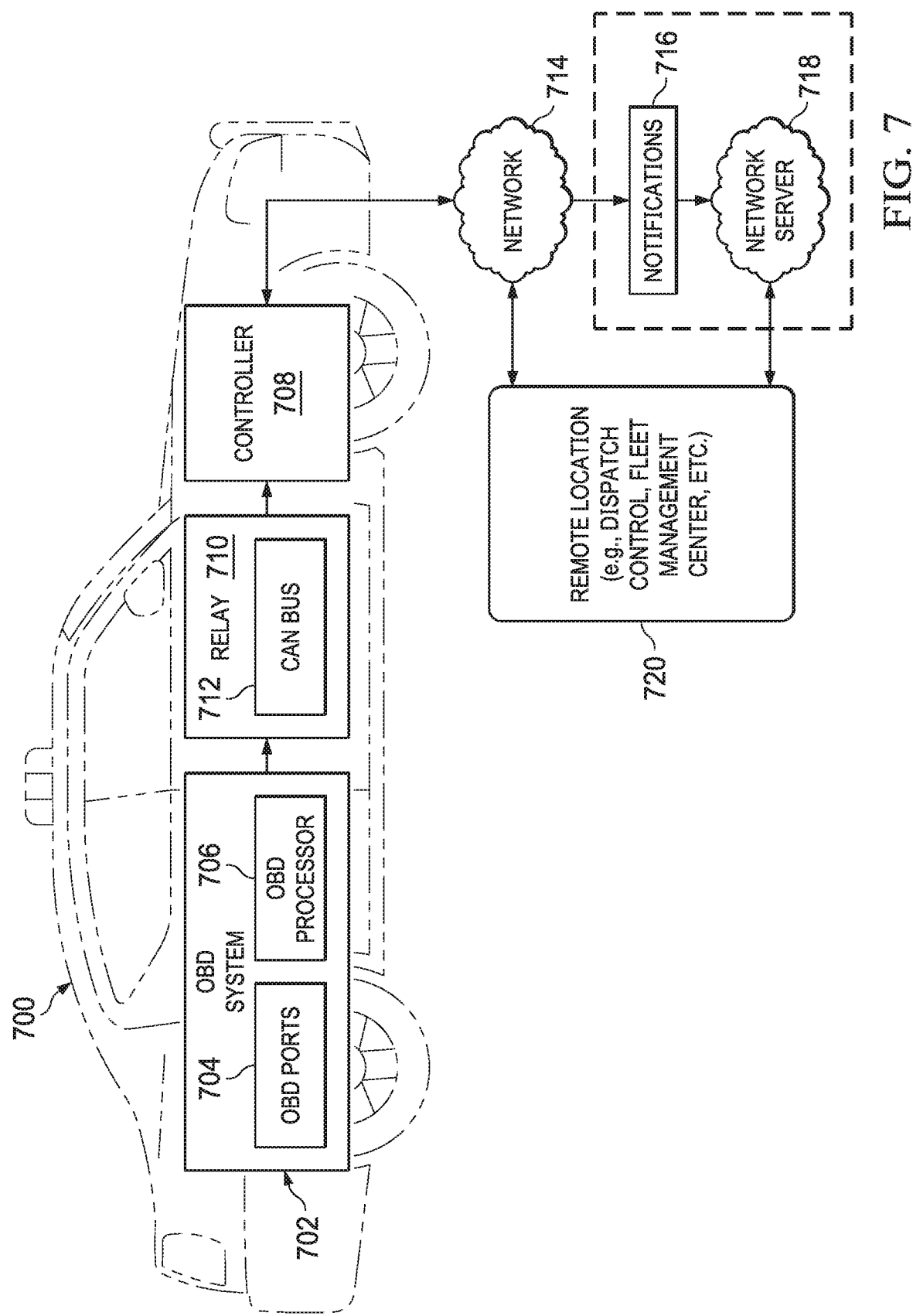
FIG. 7 is a block diagram of an exemplary system for communication between an ACCS controller and relay module and the On Board Diagnostics (OBD) system of a vehicle according to an embodiment of the invention.

FIG. 7 is block diagram of an exemplary system for an ACCS system adapted to collect and communicate operational data regarding the real-time operating status of a vehicle 700 from the vehicle's on-board diagnostics (OBD) system 702. The OBD system 702 may include one or more sensors for measuring or collecting data related to the operating status of the vehicle 700. The OBD system 702 can include a vehicle speed sensor or an accelerometer that measures the speed or acceleration of the vehicle. The OBD system 702 can also include a steering wheel position sensor that measures the angle at which the vehicle's wheels are turning. Other sensors can also be used in the OBD system 702, such as tire pressure sensors, brake sensors, emission sensors, and/or vehicle performance sensors for determining various vehicle conditions. In an embodiment, the vehicle can include a global positioning system (GPS) for sensing the location of the vehicle. The relay module 710 includes a controller area network bus (CAN Bus) port 712. The relay module 710 may access sensor data from the various sensors comprising the vehicle's OBD system via a connection between the relay module's CAN Bus port 712 and one more OBD ports 704 associated with the vehicle's OBD system 702. The relay module 710 may forward the OBD data received on the CAN Bus to the controller 708 via a serial communication connection between the controller 708 and the relay module 706 (see the RJ serial connectors 412 and 516 in FIGS. 4 and 5). Controller 708 may operate in accordance with controller 300 as discussed above in FIG. 3 and throughout the present description. The controller 708 may in turn forward the OBD data as notifications 716 to an ACCS network server 718 over a network 714 as has been described with reference to FIG. 6. A party interested in the operational status of the vehicle 700, such as a fleet manager, a mechanic, a dispatcher, or the like, may access and view the OBD data via a web portal executed on a front-end client computer 720, as has been described with regard to FIG. 6.

Returning to FIG. 6, in one embodiment, a fleet management and maintenance client computer 668 (similar to the dispatch control client computer 666) may be located in a fleet management or maintenance center or some similar facility. Like the dispatch control client computer 666, the fleet management and maintenance client computer 668 may be configured to communicate with the ACCS network server 664 over the communication network 662 via a web portal application executed by the fleet management and maintenance computer 668. A fleet manager, maintenance supervisor, or some other individual with responsibility for maintaining the fleet of vehicles may view vehicle data logs received from the controllers 300 mounted in the individual vehicles and make decisions about making repairs and scheduling maintenance based on information received directly from the vehicles' OBD systems themselves. By monitoring the OBD data from multiple vehicles within the entire fleet, maintenance and repairs can be scheduled in a timely and orderly manner without negatively impacting the overall readiness of the fleet. It is noted that the notifications and information regarding any actions or conditions associated with vehicles 650, 652, and 654 may be transmitted solely either to dispatch control client 666 or fleet management and maintenance client 668, and not necessarily both. Many organizations may solely utilize a dispatch controller, such as a group responsible for dispatch control client 666. Further, it may be that there is a fleet management and maintenance center for certain organizations or departments. Accordingly, FIG. 6 shows that there may be occasions where either a dispatch control client 666 or a fleet management and maintenance client 668 may be utilized, or both.

As mentioned, the ACCS controller 300 is configured to autonomously communicate information to the ACCS server 664. To conserve bandwidth, the controller 300 may be configured to send data to the ACCS server 664 only when a control action has been taken with respect to the auxiliary equipment, or when input sensor data has changed.

Figure 8:
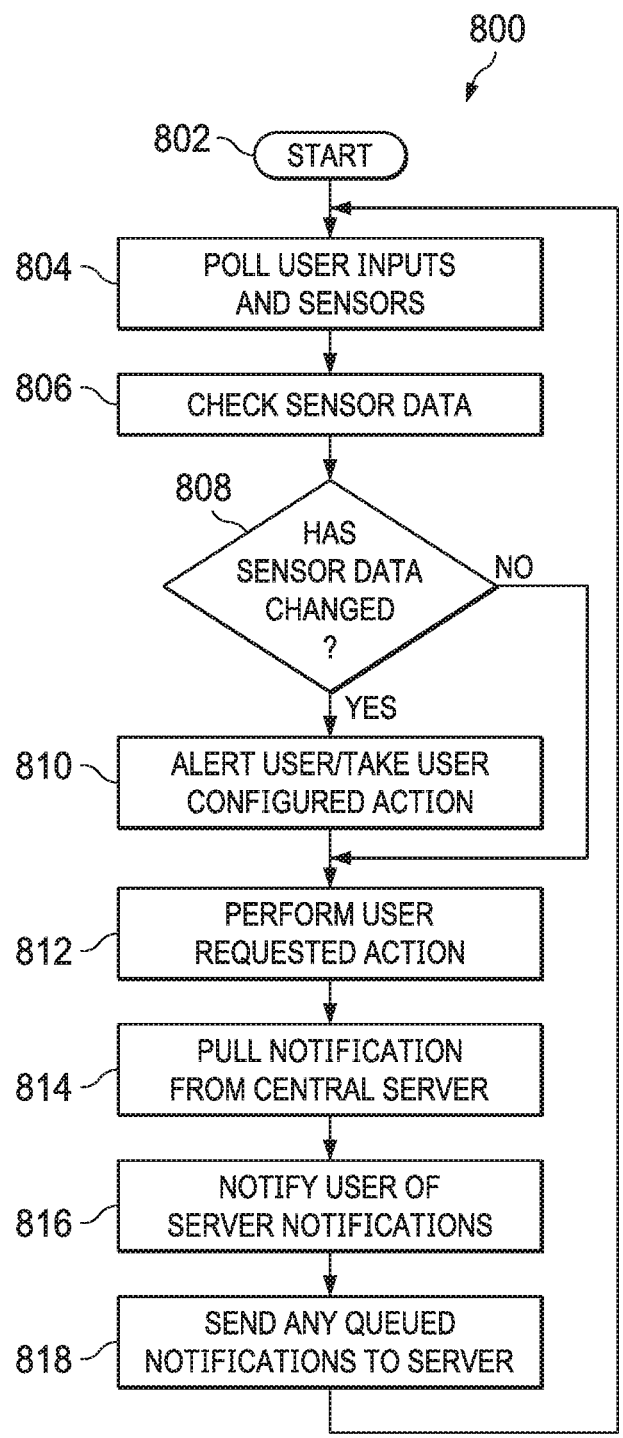
FIG. 8 is a flowchart depicting a process for communicating control information from an ACCS controller to a dispatch control center according to an embodiment of the invention.

Turning to FIG. 8 for further details how the ACCS controller 300 may communicate its messages to an ACCS server 664. FIG. 8 shows a flow chart depicting an exemplary process for managing communications between a controller 300 and the ACCS network server 664 according to an embodiment. The process begins at step 802. At step 804, a controller, such as controller 300, polls the user inputs (e.g. one of the pushbuttons 532 of the controller interface in FIG. 5) and inputs (or outputs) hardwired to a relay module, such as relay module 400 described above and shown in FIG. 4. Next, data from any sensors located within the housing of controller 300 (e.g. such as environmental sensors 304 or any other type of sensors) is checked at step 806. At decision block 808, a determination is made whether any of the inputs or the sensor data have changed since the previous communication. If so, a message is displayed alerting the vehicle occupant of the change and, when necessary, requesting that the user take appropriate action at step 810. Any user requested action is performed at step 812. If it is determined at decision block 808 that the input and sensor data have not changed, the process may proceed to step 812 where any user requested action is performed, for example, by activating certain functions for any auxiliary equipment, such as auxiliary equipment 102 shown in FIG. 1, located on a vehicle. At step 814, notification messages regarding any actions taken in the vehicle associated with any auxiliary equipment or regarding the status, condition, and maintenance of a vehicle may be pulled from a central server, such as the ACCS network server 664 depicted in FIG. 6 (i.e. network server 122 shown in FIG. 1). At step 816, the notifications received from the central server (i.e. ACCS network server 664) may be displayed on the display screen, such as touchscreen 530, of the controller interface. At step 818, any queued messages are transmitted from the controller 300 to the ACCS network server 664. Once the queued messages have been sent, the process returns to step 804 where the inputs are polled once more, and the communication process repeats.

Figure 9:
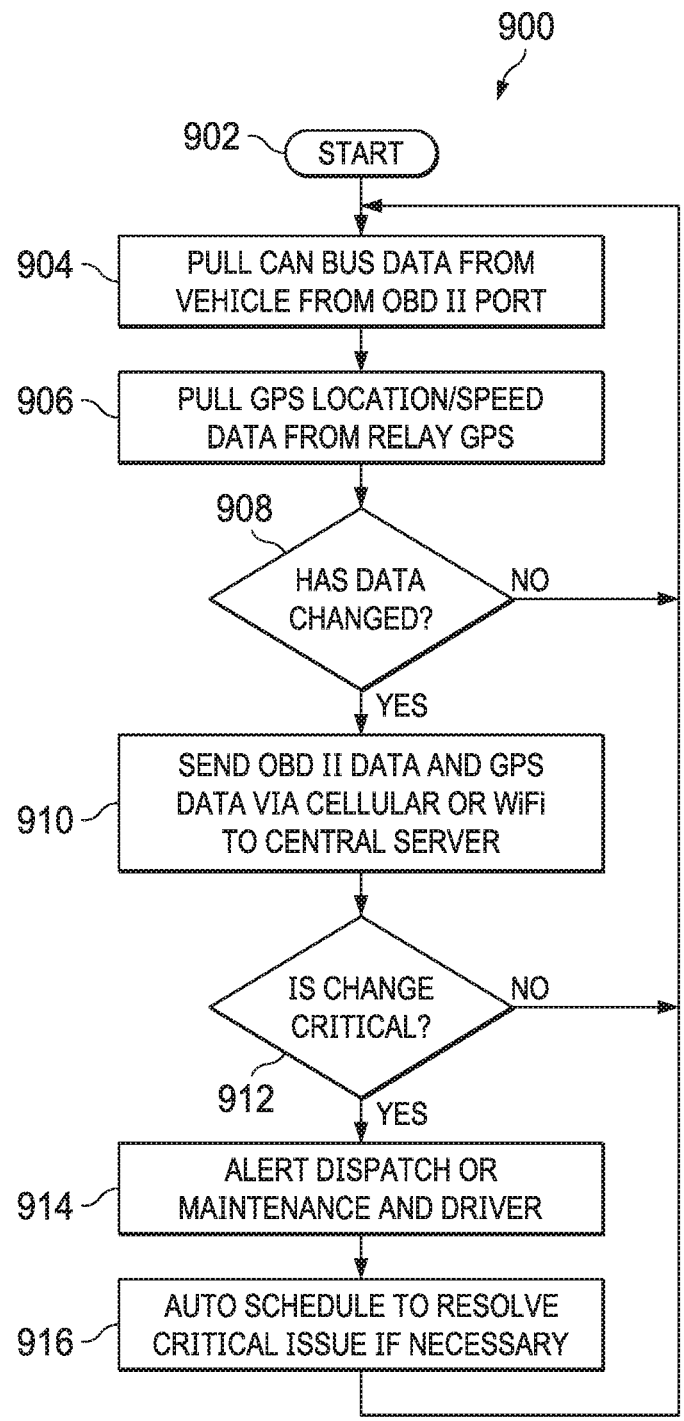
FIG. 9 is a flowchart depicting a process for communicating vehicle onboard diagnostic (OBD) information from an ACCS controller to a fleet management/maintenance center according to an embodiment of the invention.

Turning to FIG. 9, FIG. 9 is a flow chart that depicts an exemplary process flow for how data obtained from an OBD system of a vehicle may be communicated to a central server. The process begins at step 902. At step 904, vehicle operational data is pulled from the CAN bus connected to the vehicle's OBD system from a relay module, such as relay module 400. At step 906, it is optional to include this step, but in one embodiment, GPS data (including location and velocity data) are pulled from the GPS system (e.g. GPS system 414) on the relay module 400. A determination is made at decision block 908 as to whether or not the data has changed since the previous communication. If not, the process may return to step 904 where the vehicle operational data is again pulled from the CAN bus and the process repeats. However, if it is determined at decision block 908, that the vehicle operational data has changed, the vehicle data is sent to a central server, such as ACCS server 664, over a communications network, such as communications network 662 shown in FIG. 6. In one non-limiting embodiment, the vehicle operational data obtained from the OBD system may be transmitted via a wireless communication link at step 910, and may be transmitted either via cellular communication link, such as cellular communication link 656, or via a Wi-Fi communications link, such as Wi-Fi communications link 658, or through any other existing communication link known in the art.

Next, a determination is made at decision block 912 as to whether or not the data change is critical. If not, the process returns to step 904, the vehicle operational data pulled from the CAN bus and the process repeats. If, however, it is determined at decision block 912 that the data change is critical, several alerts may be sent to relevant parties. As shown at step 914, an alert may be sent to the occupant of the vehicle to be displayed on a touchscreen of the controller interface, such as touch screen 530 shown in FIG. 5. In this manner, the occupant/driver of the vehicle is notified about certain issues with his or her vehicle via not just the vehicle's designated screens, but also the touchscreen of the controller. This may help to increase a driver's responsiveness and awareness of any maintenance issues for his or her vehicle. Further, in one embodiment, an alert message may also be sent to a dispatch control manager or fleet management and maintenance manager. In one embodiment, it may be possible for these alerts to be transmitted to the relevant parties via a central server, such as ACCS server 664. In one embodiment, it may also be feasible for an appointment to bring the vehicle in for repairs to be automatically scheduled or arranged to be scheduled at step 916 in order to resolve a critical vehicle repair issue that presents itself based on the data obtained from the OBD system of the vehicle. From there, the process returns to step 904 and the process repeats.

This portion of the description includes further detailed information about one of the intended functions of an ACCS system, which may be to implement a tracking system for keeping track of tools and equipment and other assets that are to be stored within the vehicle as discussed with respect to assets 112 in FIG. 1. Emergency vehicles typically carry a long list of items for dealing with a multitude of emergency situations. A fully stocked police squad car, for example, may store flares, traffic cones, blankets, emergency kits, a safety hammer to break window glass, seat belt cutters, handcuffs, flashlights, extra fire arms and various other pieces of equipment. Fire and EMS vehicles will likely include a far longer list of equipment. It is intended for a real time location tracking system to be part of the ACCS system to track such equipment and to make sure that a vehicle is fully stocked with all of the necessary equipment before the vehicle is taken out on patrol or responds to an emergency or any other purpose for the vehicle.

In one embodiment, location tracking technology may be used and connected to equipment located within a vehicle. Such location tracking technology may include, but is not limited to, Radio Frequency ID (RFID) chips, ultra-wide band (UWB) tracking chips, Bluetooth Low Energy (BLE) chips or some other location tracking technology known in the art or yet to be discovered.

Returning to FIG. 2, the squad car 200 is equipped with one or more tracking sensors or beacons shown figuratively as tracking sensor or beacon 230. The placement show for tracking sensor or beacon 230 is illustrative only and non-limiting. Alternative placements for tracking sensor or beacon 230 are contemplated including that the tracking sensor or beacon 230 may be placed anywhere in or on the vehicle and more than one may be used as well, The one or more tracking sensors may comprise RFID readers, USB receivers, BLE beacons or some other sensor/receiver corresponding to the location tracking technology employed. A single sensor/beacon 230 may be employed to sense tagged items within a general sensing perimeter such a sensing perimeter 226 in FIG. 2. Alternatively, a combination of three or more sensors/beacons 230 may be employed to more precisely locate tagged items as being, for example, located within the actual confines of the vehicle itself, and even point to a more specific location in the vehicle where they may be located. In one embodiment, the beacon 230 may be connected to one of the RJ connector serial ports 412 of the ACCS relay module 400. Various exemplary assets that are to be stored in the vehicle may include a first aid kit 212, a flashlight 214, a traffic cone 216 and a shot gun 228. An ID tag 224 is attached to each item. The ID tags 224 may be permanently or semi-permanently attached to each asset or item using any type of attachment means known in the art. It may be useful to have the ID tags 224 attached in a semi-permanent manner so that the ID tags 224 may be reused or transferred to other items as desired by the user.

In one embodiment, the ID tags 224 may be RFID tags, UWB chips, or BLE tags depending on the type of beacon 230 that is employed. The beacon 230 functions to sense the presence of the ID tags 224 within a specified sensing perimeter 226 of the beacon. If a single sensor or beacon 230 is employed, the sensing perimeter 226 may comprise a general perimeter or distance around vehicle 200 within which beacon 230 is capable of detecting the presence of the assets having one or more ID tags 224. Once the asset with the ID tag 224 is no longer within the specified sensing perimeter 226, then the asset is not detectable. Greater locating precision may be obtained if additional sensors or beacons 230 are employed. With such greater precision the sensing perimeter 226 may be reduced to essentially the contours of the vehicles 200 itself. It may be an additional advantage if additional sensors or beacons are used so that the location sensing system may determine whether the tagged assets are actually located within the vehicle, however, using one beacon or sensor may also provide such information. The ACCS controller 300 and/or the ACCS network server 664 may maintain an inventory list of tagged items that are supposed to be stored in the vehicle 200. The assets (i.e. removeable assets 112) whose ID tags 224 are detected within the specified sensing perimeter 226 may be logged as being present in the vehicle 200 and displayed in a notification to the driver or user of the vehicle 200 as such. Further, those assets whose ID tags 224 are not detected within the specified sensing perimeter 226 may be logged and displayed to the driver and user of the vehicle as being absent from vehicle 200.

Based on the example scenario provided in FIG. 2, the first aid kit 212, the traffic cone 216 and the shotgun 218 may be logged as being present in vehicle 200, because these assets are within the specific sensing perimeter 226 while those assets outside the sensing perimeter 226, such as the flashlight 214, may be logged as being absent from the vehicle 200. In one embodiment, it is intended for a message to be displayed on the touchscreen (or other type of interface) of the controller 300, thus alerting an occupant of the vehicle 200 of any missing items or assets (e.g. assets 112). In a simplified description of how the user may be notified, a message may be displayed on a screen of the controller 300 (e.g. screen 530), which may include a name or label for the asset and whether the asset or item is "present or not present" or "found or not found". Thus, the driver and other occupants of the vehicle are alerted from the beginning what assets are present and can make a determination whether they need to go and look for the other missing assets that are detected outside of the sensing perimeter 226.

In one embodiment, it may also be desirable for the controller 300 to communicate the inventory list of present and absent items directly to a central server, such as the ACCS network server 664 shown in FIG. 6. Dispatch control or maintenance personnel or other type of personnel may then access the inventory list via the dispatch control client computer 666 or the fleet management and maintenance client computer 668 to re-supply any missing items and/or also make sure the driver and occupants are aware of the missing items. Further, dispatch control personnel may take steps to have any such missing items delivered to that particular vehicle. Accordingly, there are many advantages to have such a system for tracking particularly useful equipment or assets.

Figures 10, 11:
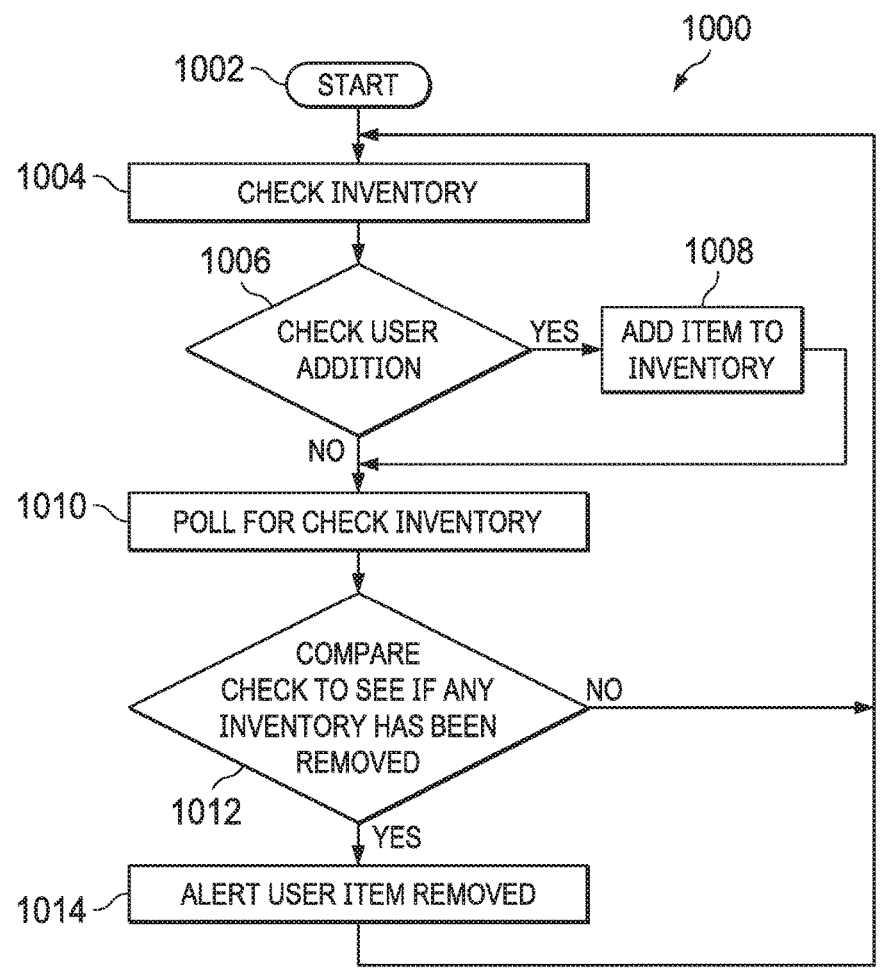
FIG. 10 is a flowchart depicting an inventory management process for tracking removable assets in a vehicle according to an embodiment of the invention.
FIG. 11 is a sample information window displayed on an LCD touchscreen as part of an ACCS controller interface according to an embodiment of the invention.

Turning to FIG. 10, FIG. 10 is a flowchart depicting an inventory management process for tracking removable assets in a vehicle according to one exemplary embodiment. Therefore, a process 1000 for managing an inventory of removable assets, such as those assets shown in FIG. 2 or removable assets 112 in FIG. 1, implemented by the real-time location tracking system implemented by the ACCS controller 300 and relay module 400 according to an embodiment is shown in FIG. 10. The process begins at

1002. The inventory list is checked at step 1004. At decision block 1006, a determination is made as to whether the user has added any new items to the inventory list. If so, the additional items are added to the inventory list at step 1008. If not, the process moves directly to step 1010. At step 1010, a controller, such as controller 300 polls the inventory to determine which assets are present within the vehicle. At decision block 1012, the inventory check is compared to the inventory list to determine whether or not any assets from the inventory list have been removed from the vehicle. If not, the process returns to step 1004 where a new inventory check is performed and the process repeats itself. Otherwise, if it is determined at decision block 1012 that an asset has been removed, a message may be displayed on the touchscreen or other type of interface associated with the controller (e.g. touchscreen 530 of controller 300) alerting the vehicle occupant that the item has been removed. Once the message has been displayed, the process returns to step 1004 and the process repeats.

In addition to logging data and events, the ACCS server 664 may also push information to the vehicles 650, 652, 654. Messages from the ACCS network server 664 may be directed to individual vehicles, groups of vehicles, or the entire fleet of vehicles. For example, a message originating from the fleet management and maintenance client computer 668 indicating that vehicle 650 is scheduled for maintenance on Tuesday may be directed by the ACCS server 664 to vehicle 650 alone. Upon receiving the message, the controller 300 in the vehicle 650 displays the message on the touchscreen 630.

Other messages may be directed to only a subset of vehicles in the fleet. For example, messages containing subject matter relevant to only a subset of officers may be sent only to the controllers 300 mounted in the vehicles assigned to those officers. Alternatively, messages may be sent to a subset of the vehicles based on the geographic location of the vehicles. For example, a dispatcher may wish to alert other vehicles located in the general vicinity of the first vehicle 650 that the officer driving the first vehicle is engaged in a traffic stop. As has been described above, in one embodiment, the locations of all three of the vehicles 650, 652, 654 are reported to the ACCS server 664 based on GPS measurements reported by the GPS modules 414 on the ACCS relay modules 400 in each vehicle. The locations of the vehicles 650, 652, and 654 may be shared directly with dispatch control client 666 in one embodiment and dispatch control may then send select notifications to specific vehicles. From the GPS data, it may be determined that the second vehicle 652 is located within a few blocks of the first vehicle 650, while the third vehicle 654 is miles away on the other side of town. To continue with the example, either the ACCS server 664 or dispatch control associated with the dispatch control client 666 may communicate the information that the officer in the first vehicle 650 is engaged in a traffic stop to the officer in the second vehicle 652, but not to the officer in the third vehicle 654 since the officer in the second vehicle 652 is close enough to render meaningful assistance, while the officer in the third vehicle 654 is not. Withholding the message from the third officer helps prevent information overload by withholding irrelevant information, allowing the third officer to concentrate on matters more germane to the areas he or she happens to be patrolling. Finally, messages that impact the entire fleet can be broadcast simultaneously to every vehicle in the fleet.

Messages may be issued by dispatch control associated with dispatch control client 666 if the message meets a priority level for notifying other vehicles. Messages may be prioritized based on the critical or non-critical nature of the information contained therein. Messages reporting critical emergencies, such as information that an officer has been shot, or that shots have been fired may be given higher priority than messages regarding routine traffic stops or other less critical events. High priority messages may be pushed to the top of a stack of messages to be displayed on the touchscreen 530 of an ACCS controller 300, ensuring that the high priority messages are seen first. The determination of what information is to be sent to which locations and when it is sent may be made automatically by the ACCS network server 664 or manually by a dispatcher at the dispatch control center.

Messages are displayed on the LCD screen 530 included in the interface 302 of controller 300. FIG. 11 shows a sample LCD display window according to an embodiment. The display window 1100 includes an upper portion that displays prioritized messages received from the ACCS server. As can be seen from example, the messages may relate to events and control actions that have taken place in nearby vehicles. Thus, a first message 1102 indicates that a vehicle 103 reported shots fired. A second message 1104 indicates that the officer in vehicle 407 has released the gunlock on his or her weapon. A third message 1106 indicates that an officer associated with vehicle 506 has issued a code 3 alert (whereby lights and sirens are both operated usually indicating an emergency). The LCD touch screen allows an officer to scroll through the messages displayed in the upper portion of the window with just a fingertip.

In this non-limiting, exemplary illustration of how messages may be displayed on a screen 530 of controller 300, a lower portion of the display window may be reserved for displaying information about the vehicle in which the controller is mounted and its environments. For example, the outside temperature 1108, the status of the light bar mounted on the vehicle 1110, vehicle repair requirements 1112, and the status of a camera or video recorder 1114 may all be shown on a lower portion of the LCD display window.

Of course, alternative display interface windows may be implemented without deviating from the inventive aspects of the present disclosure. For example, the messages and/or data shown displayed in FIG. 11 as well as other data, may be presented to a user across a series of nested display windows. Navigation buttons, such as forward and back arrows, or menu buttons may be provided for accessing data organized on different display pages. Much of the information displayed on the display window 1100 may be selected by personnel viewing data received from one or more vehicles in near real-time at a front-end client such as the front-end client 670 of FIG. 6. In this case, the person viewing the incoming information may determine which information is appropriate to be displayed for the particular vehicle in which the LCD touch screen 1100 is located. In this way selected notifications may be sent to specific vehicles and incorporated into the LCD display windows of the controllers mounted in each vehicle and the vehicle occupants may quickly scroll through display windows to find the most urgent and relevant messages for their particular circumstances.

Figure 12:
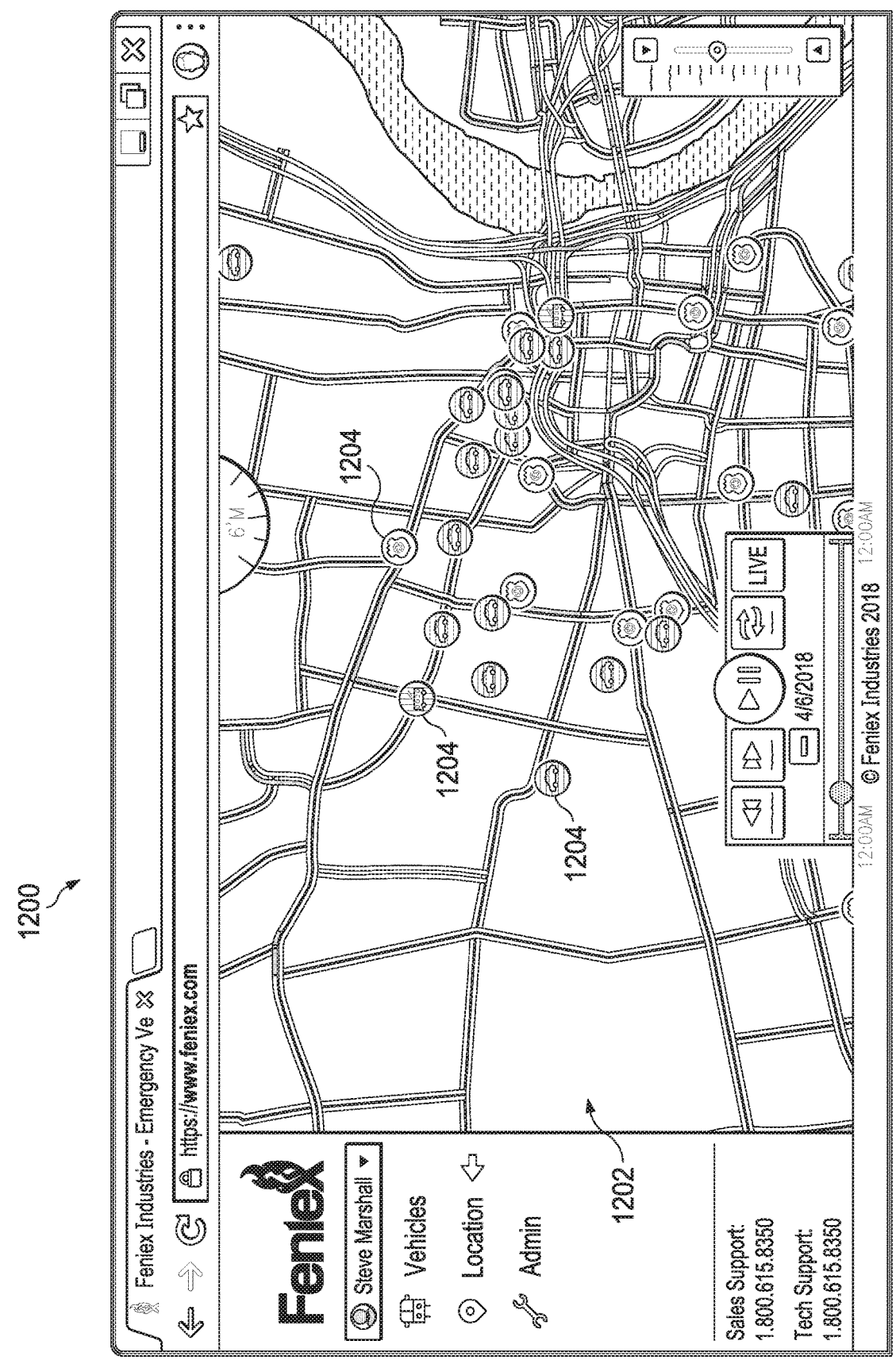
FIG. 12 is an example of a dispatch client display window for displaying information gathered by an ACCS regarding the individual vehicles in a fleet of vehicles.

Turning to FIG. 12, an example of a dispatch client display window 1200 is shown. The dispatch display window 1200 may be displayed by a dispatch client such as the dispatch client 666 executed by the front-end client computer 670 shown in FIG. 6. The dispatch display window 1200 is intended to display a significant amount of information gathered by an ACCS regarding the individual vehicles in a fleet of vehicles in a quick and easily comprehended manner. The information may be used, for example, to assist a dispatcher in making decision about deploying vehicles and allocating resources in the course of day to day operations of the organization employing the vehicles. The dispatch display window 1200 is exemplary only. Fleet information gathered from an ACCS may be displayed in alternate ways without deviating from the inventive concept of the present disclosure. The dispatch client display window 1200 includes a map 1202 of the area in which the vehicles are operating. Symbols 1204 representing the various vehicles are superimposed on the map in locations corresponding to the real-world locations of the corresponding vehicles. Different symbols may represent different types of vehicles, for example, symbols showing a car with roof lights may represent police squad cars, symbols showing a police badge may represent vehicles with supervisory personnel, and symbols showing a fire engine may represent the locations of fire department vehicles, and so on. According to an embodiment, additional information regarding a particular vehicle may be displayed my selecting the symbol corresponding to the vehicle of interests.

Figure 13:
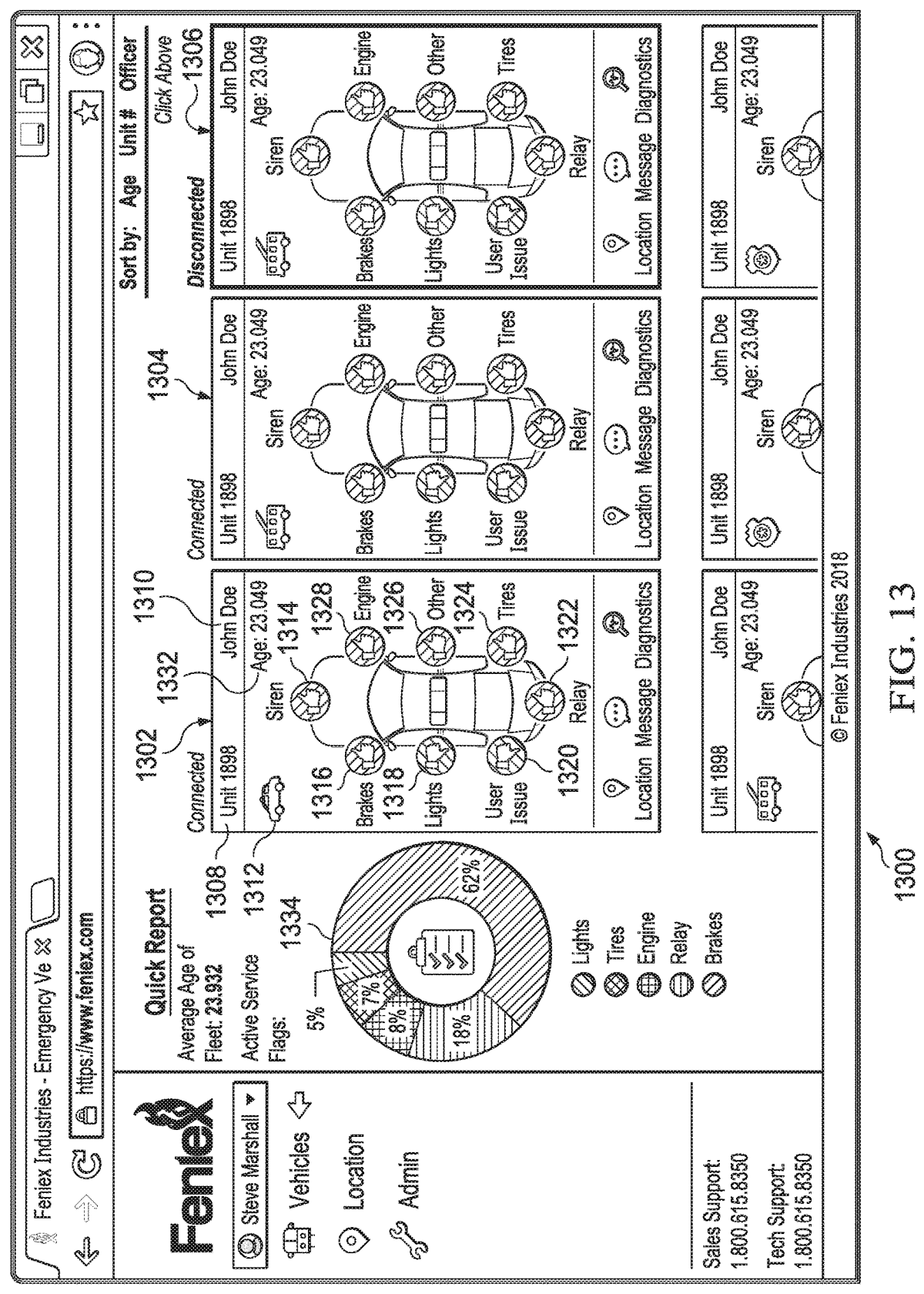

Turning to FIG. 13, an example of a fleet management and maintenance client display window 1300 is shown. The fleet management and maintenance client display window 1300 may be displayed by a fleet management and maintenance client such as the dispatch client 668 executed by the front-end client computer 670 shown in FIG. 6. The fleet management and maintenance client window 1300 is intended to display a significant amount of information gathered by an ACCS from the OBD systems of individual vehicles in a fleet of vehicles in a quick and easily comprehended manner. The information may be used, for example, to assist a fleet manager or mechanic or some other person tasked with maintaining the vehicles track various systems on the vehicles to proactively schedule service and maintenance visits to keep the vehicles in the best operating condition possible. The fleet management and maintenance client window 1300 is exemplary only, vehicle status information gathered from an ACCS may be displayed in alternate ways without deviating from the inventive concept of the present disclosure. The fleet management and maintenance client window 1300 includes one or more graphic representations of the status of the vehicles in the fleet 1302, 1304, 1306. The graphic representations of the status of the vehicles include a vehicle ID 1308, and the name of an individual assigned to the vehicle 1310. A vehicle type icon 1312 identifies the type of vehicle being represented by the graphic. A generalized representation of a vehicle 1330 is surrounded by a plurality of system status icons adapted to communicate the status of various vehicle systems. According to an embodiment, the system status icons include a green "thumbs up" icon indicating that the system in question is in good order, and a red "thumbs down" icon indicating that the system in question is not in good working order. In the example shown, system status icons are provided for Sirens 1314; Brakes 1316; Lights 1318; User Issue 1320; Relay 1322; Tires 1324, Other Systems 1326; and Engine 1328. A data field 1332 displays the mileage recorded by the vehicle's odometer. An additional graphic 1334 displays various statistics about the status of the fleet. The graphic 1334 shows the percentage of vehicles in the fleet having various service flags (thumbs down or thumbs up icons) corresponding to the various systems represented in the fleet management and maintenance client window 1300. It is noted that the images shown in FIGS. 12 and 13 are illustrative only and non-limiting, as those of ordinary skill the art may understand that there may be variations in the presentation of the above information.

The above embodiments include a number of beneficial functions and features in having an autonomous communication and control system for vehicles. Many vehicles, particularly first responders, would greatly appreciate and benefit from having a quicker and more efficient way of notifying dispatch control or another fleet management maintenance center of any events or actions occurring with their vehicles. As noted above, embodiments herein describe sharing actions and control functions engaged by a user for his or her auxiliary equipment. Further, the OBD system of a vehicle may be accessed and any maintenance or repair issues that are flagged may be shared with a vehicle's occupants as well as with a connected dispatch control center or fleet management maintenance center. In addition, embodiments herein describe a process and system for tracking important removable assets or inventory items that should be in a vehicle. Many additional benefits are described and provided throughout the present description for the autonomous communication and control system described herein.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical, and chemical changes may be made without departing from the spirit or scope of the invention.

What is claimed is:

1. An autonomous communication and control system for controlling auxiliary equipment associated with a vehicle, the autonomous communication and control system comprising:
   a control unit including an interface for receiving an input command from an occupant of the vehicle for taking a control action relating to the auxiliary equipment, wherein the control unit is configured to be attached to a location within the vehicle, wherein the auxiliary equipment comprises visual and acoustic devices that are attachable to the vehicle;
   an output relay module in communication with the control unit adapted to execute the control action relating to the auxiliary equipment, wherein the output relay module is a separate device from the control unit, and further wherein the output relay module is configured to be attached to a location within the vehicle;
   a communication module associated with the controller adapted to autonomously communicate an indication of the executed control action over a communication network; and
   a network server connected to the communication network adapted to receive and log the indication of the executed control action.

2. The autonomous communication and control system of claim 1 further comprising a dispatch control center client computer executing a web portal application for accessing one or more logged indications of the control action executed by the control unit for the purpose of monitoring a status of the auxiliary equipment associated with the vehicle.

3. The autonomous communication and control system of claim 2 wherein the dispatch control center client computer is further adapted to allow a dispatcher to compose messages and to communicate the messages to the network server, the network server further adapted to communicate the messages to the control unit via the communication network, the control unit including a display for displaying the messages received from the network server.

4. The autonomous communication and control system of claim 3 wherein the dispatch control center client computer is adapted to selectively direct the messages to a plurality of control units associated with a plurality of different vehicles.

5. The autonomous communication and control system of claim 4 wherein the messages are selectively directed to the control units of different vehicles based on the locations of the vehicles.

6. The autonomous communication and control system of claim 1 wherein the control unit is further adapted to monitor an onboard diagnostic (OBD) system associated with the vehicle, and the communication module is adapted to communicate OBD information regarding an operating status of the vehicle over the communication network, and the network server is adapted to receive and log the OBD information.

7. The autonomous communication and control system of claim 6 further comprising a fleet management and maintenance center client computer executing a web portal application for accessing logged OBD information for monitoring an operational status of the vehicle and scheduling maintenance.

8. The autonomous communication and control system of claim 7 wherein the fleet management and maintenance center client computer is further adapted to communicate the scheduled maintenance messages to the network server, the network server being further adapted to communicate the messages to the control unit via the communication network, and the control unit including a display for displaying the scheduled maintenance messages received from the network server.

9. The autonomous communication and control system of claim 1 further comprising a real-time location system, wherein the control unit is adapted to maintain an inventory list of one or more removable assets to be stored within the vehicle, and wherein the real-time location system is adapted to detect the presence or absence of said one or more removable assets within the vehicle and to communicate information regarding the presence or absence of the one or more removable assets to the control unit, and wherein the control unit is adapted to display a message indicating that a removeable asset of the one or more removable assets is missing when the real-time location system detects the absence of the removable asset.

10. The autonomous communication and control system of claim 9 wherein the real-time location system is one of an RFID, UWB, or BLE positioning system in which a location transceiver associated with the vehicle is adapted to read identification tags affixed to the one or more removable assets.

11. The autonomous communication and control system of claim 1, wherein the interface comprises at least one of a touch screen, a programmable push button, and a multi-position switch.

12. The autonomous communication and control system of claim 1, wherein the interface comprises a touch screen and the plurality of programmable user inputs comprise touchscreen buttons displayed on the touch screen.

13. A communication system for monitoring a status of a plurality of vehicles within a fleet of vehicles and selectively transmitting and displaying messages to occupants of individual vehicles within said fleet of vehicles, the communication system comprising:
  a network server adapted to send and receive information over a communication network;
  a plurality of control units, wherein each control unit is configured to be attached to a location within each vehicle within the fleet of vehicles, wherein the plurality of the control units are adapted to wirelessly access the communication network to send and receive information to and from the network server the plurality of control units further comprising:
    an interface for receiving input commands from an occupant of the vehicle in which the control unit is mounted and for displaying messages received from the network server to the occupant, wherein the input commands relate to control actions to be taken with respect to auxiliary equipment associated with the vehicles, and wherein the plurality of control units are adapted to communicate the control actions taken with respect to the auxiliary equipment to the network server, wherein the auxiliary equipment comprises visual and acoustic devices that are attachable to the vehicle; and
  a plurality of output relay modules in communication with the plurality of control units, wherein the plurality of output relay modules are adapted to execute the control actions relating to the auxiliary equipment,
  wherein each output relay module is a separate device from each control unit, and further wherein each output relay module is configured to be attached to a location within the vehicle.

14. The communication system of claim 13 further comprising global position system (GPS) units associated with individual vehicles within said fleet of vehicles, and wherein the control units mounted within the vehicles having the GPS units are adapted to communicate location information about the vehicles having the GPS units.

15. The communication system of claim 14 wherein the network server is adapted to selectively transmit the messages to individual vehicles within said fleet of vehicles for display by the control units within the individual vehicles based on the location information of the individual vehicles.

16. The communication system of claim 13 wherein the control units include an environment sensor for measuring an environmental condition within the vehicle and the control units are adapted to communicate measurements of the environmental condition to the network server.

17. The communication system of claim 16 wherein the environmental sensor comprises one of a temperature sensor, a carbon monoxide sensor, and an accelerometer.

18. The communication system of claim 13 wherein the control units include a controller area network (CAN) bus port for accessing onboard diagnostic systems of the vehicles and wherein the control units are adapted to read vehicle operating parameter data from the onboard diagnostic systems and communicate the vehicle operating parameter data to the network server.

19. The communication system of claim 18 wherein the interface of the control units is adapted to display the vehicle operating parameter data read from the onboard diagnostic systems of the vehicles.

20. The communication system of claim 18 further comprising a fleet maintenance client computer adapted to access the network server to view the vehicle operating parameter data and to schedule maintenance on said vehicles based on the operating parameter data and to communicate maintenance information to the control units for display by the control unit interfaces.

21. The communication system of claim 13 further comprising a dispatch control center computer adapted to access the network server to view control actions to be taken with respect to auxiliary equipment associated with the vehicles and to direct messages to the control units in individual vehicles via the server based on the control actions taken with respect to the auxiliary equipment associated with the vehicle.

22. The communication system of claim 13 further including a real-time location system, wherein the control units are adapted to maintain an inventory list of one or more removable assets to be stored within the vehicles, and wherein the real-time location systems are adapted to detect the presence of said one or more removable assets within the vehicles and to communicate information indicating the absence of one or more of the removable assets.

23. The communication system of claim 22 wherein the real-time location system is one of an RFID, UWB or BLE positioning system in which location transceivers associated with the vehicles are adapted to read identification tags affixed to the one or more removable assets.

24. A method of controlling auxiliary equipment associated with a vehicle and communicating status information about the vehicle and the auxiliary equipment associated therewith, the method comprising the steps of:
  providing a controller having an interface that includes a plurality of input buttons adapted for receiving user input commands for controlling operation of the auxiliary equipment and a display for displaying messages to an occupant of the vehicle, wherein each controller is configured to be attached to a location within the vehicle, wherein the auxiliary equipment comprises visual and acoustic devices that are attachable to the vehicle;
  providing an output relay module communicatively coupled to the controller for providing a control signal to the auxiliary equipment to execute a control action based on the user input commands received by the controller interface, wherein the output relay module is a separate device from the controller, and further wherein the output relay module is configured to be attached to a location within the vehicle;
  providing a wireless transceiver associated with the controller and adapted to wirelessly couple the controller to a communication network;
  providing a network server communicatively coupled to the communication network;
  receiving a user input command via one of the plurality of input buttons;
  providing the control signal to the auxiliary equipment based on the received user input command; and
  communicating an indication of the control action taken in response to the user input command from the controller to the network server via the communication network.

25. The method of claim 24 further comprising the steps of:
  connecting the output module to a controller area network bus associated with the vehicle;
  accessing vehicle data from an onboard diagnostic system associated with the vehicle via the controller area network bus; and
  communicating the vehicle data to the network server via the network.

26. The method of claim 25 further comprising the step of providing a client computer executing a web portal application for accessing vehicle data stored on the server.

27. The method of claim 26 wherein the client computer comprises a dispatch computer for dispatching resources according to the indication of a control action taken in response to the user input command communicated from the controller to the network server.

28. The method of claim 26 wherein the client computer comprises a fleet management/maintenance computer for managing a fleet of vehicles and scheduling repairs according to the vehicle data communicated to the network server.

29. The method of claim 24 further comprising the step of communicating a message from the network server to the controller to be displayed on the display.

30. The method of claim 24 further comprising the steps of providing a plurality of environment sensors associated with the controller and communicating environment sensor data to the network server.

* * * * *